(12) United States Patent
Nakatani et al.

(10) Patent No.: US 6,900,947 B2
(45) Date of Patent: May 31, 2005

(54) IMAGING LENS DEVICE

(75) Inventors: Toru Nakatani, Sakai (JP); Kyoichi Miyazaki, Sennan (JP); Shinji Yamaguchi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 19 days.

(21) Appl. No.: 10/656,007

(22) Filed: Sep. 5, 2003

(65) Prior Publication Data

US 2005/0013016 A1 Jan. 20, 2005

(30) Foreign Application Priority Data

Jul. 18, 2003 (JP) ........................................ 2003-198930

(51) Int. Cl.$^7$ .............................................. G02B 15/14
(52) U.S. Cl. ...................................................... 359/689
(58) Field of Search ................................. 359/683, 689

(56) References Cited

U.S. PATENT DOCUMENTS

| | | | | |
|---|---|---|---|---|
| 4,999,007 A | | 3/1991 | Aoki et al. ................. | 350/426 |
| 5,604,637 A | * | 2/1997 | Goosey, Jr. ................. | 359/689 |
| 5,745,301 A | | 4/1998 | Betensky et al. ........... | 359/689 |
| 5,999,329 A | | 12/1999 | Ohtake ........................ | 359/686 |
| 6,088,169 A | | 7/2000 | Ohno ........................... | 359/682 |
| 6,349,002 B1 | | 2/2002 | Shibayama et al. ........ | 359/689 |
| 6,452,729 B2 | | 9/2002 | Yamamoto ................... | 359/676 |
| 6,522,476 B2 | | 2/2003 | Koreeda ....................... | 359/681 |
| 6,538,824 B1 | | 3/2003 | Mihara et al. ............... | 359/684 |
| 6,545,819 B1 | | 4/2003 | Nanba et al. ................ | 359/689 |
| 6,804,064 B2 | * | 10/2004 | Hirakawa ..................... | 359/682 |
| 6,829,102 B2 | * | 12/2004 | Ohashi et al. ............... | 359/689 |

FOREIGN PATENT DOCUMENTS

| | | |
|---|---|---|
| JP | 06-094996 A | 4/1994 |
| JP | 2001-033701 A | 2/2001 |
| JP | 2001-242378 A | 9/2001 |
| JP | 2001-281547 A | 10/2001 |
| JP | 2001-343584 A | 12/2001 |
| JP | 2002-014284 A | 1/2002 |
| JP | 2002-196238 A | 7/2002 |
| JP | 2002-196240 A | 7/2002 |
| JP | 2002-244043 A | 8/2002 |
| JP | 2002-341245 A | 11/2002 |
| JP | 2002-350726 A | 12/2002 |

* cited by examiner

Primary Examiner—Scott J. Sugarman
(74) Attorney, Agent, or Firm—Sidley Austin Brown & Wood LLP

(57) ABSTRACT

An imging lens device has a zoom lens system and an imaging sensor. The zoom lens system has a plurality of lens units and changes gaps between the lens units to thereby generate an optical image of an object which can be optically and successively zoomed in and out. The imaging sensor which converts an optical image generated by the zoom lens system into an electric signal. The zoom lens system comprises, from the object side, a first unit having a negative power, a second unit having a positive power, the second unit having a cemented lens element joining three lens elements, and a lens element having a positive power, a third unit having a positive power, and an aperture stop disposed between the first unit and the second unit. Among the three lens elements which form the cemented lens element, a lens element disposed on the object side directs a convex surface toward the object side while a lens elements disposed on the image side directs a concave surface toward the image side. The zoom lens system is fulfilled the predetermined conditions.

11 Claims, 16 Drawing Sheets

IMAGING LENS DEVICE

RELATED APPLICATION

This application is based on application No. 2003-198930 filed in Japan, the content of which is hereby incorporated by reference.

FIELD OF THE INVENTION

The present invention relates to an imaging lens device comprising an imaging sensor which converts an optical image generated on a light receiving surface of a CCD (Charge Coupled Device), a CMOS (Complementary Metal-oxide Semiconductor) sensor or the like into an electric signal and more particularly, to an imaging lens device which serves as a principal element of a camera which is disposed within or externally attached to a digital camera, a personal computer, a mobile computer, a cellular telephone, a PDA (personal digital assistance), etc. To be more specific, the present invention relates to a compact-size imaging lens device which comprises a zoom lens system.

DESCRIPTION OF THE PRIOR ART

The recent years have seen an increasingly popular use of a digital camera which, using an imaging sensor such as a CCD and a CMOS sensor instead of a silver halide film, converts an optical image into an electric signal, digitizes the data and records or transfers the data. Since CCDs, CMOS sensors and the like having a high pixel count such as three or four million pixels have become recently available at relatively inexpensive prices for such digital cameras, a demand for a high-performance imaging lens device equipped with an imaging sensor is dramatically increasing, thereby giving rise to a particularly strong demand for a compact imaging lens device which comprises a zoom lens system which is capable of zooming in and out without deteriorating an image quality.

In addition, owing to an improvement in image processing capability of a semiconductor element and the like over the recent years, imaging lens devices are more often built within or externally attached to personal computers, mobile computers, cellular telephones, PDAs (personal digital assistance) and the like these days, which further accelerates a growing demand for high-performance imaging lens devices.

Known as a zoom lens system which is favorable to be used in an imaging lens device is such a zoom lens system which comprises a first unit having a negative power, a second unit having a positive power and a third unit having a positive power disposed in this order from the object side and changes gaps between the units for zooming.

As a zoom lens system which comprises a first unit having a negative power, a second unit having a positive power and a third unit having a positive power, a zoom lens system described in Japanese Laid-Open Patent Application No. 2002-350726 for instance is known.

A zoom lens system as that according to Japanese Laid-Open Patent Application No. 2002-350726 which comprises a first unit having a negative power, a second unit having a positive power and a third unit having a positive power and changes gaps between the units for zooming has a problem that the second unit which is most dominant in realizing the zooming effect has a high eccentric sensitivity. As referred to here, an eccentric sensitivity is the magnitude of an influence over an imaging capability exerted by eccentricity which has developed between lens elements which form a zoom lens system because of a components-related error, an assembly error, etc. In the case of an optical system having a high eccentric sensitivity, the high eccentric sensitivity increases a cost of an imaging lens device, since even the slightest eccentricity will impair an imaging capability, assembly is not easy, a high accuracy is demanded of parts and components, and more steps of adjustments and inspections become necessary during assembly. While imaging lens devices these days are becoming dramatically smaller and smaller, the smaller an imaging lens device is, the larger an influence of an eccentric sensitivity over adjustments during assembly is.

Japanese Laid-Open Patent Application No. 2002-350726 discloses to form the second unit by a positive lens and a cemented lens which is obtained by joining three lens elements of a positive lens, a negative lens and a positive lens, for the purpose of lowering the eccentric sensitivity of the second unit. However, this zoom lens system is not compact because the second unit is thick along an optical axis direction.

SUMMARY OF THE INVENTION

In light of the problems described above, the present invention aims at providing an imaging lens device comprising a zoom lens system which has a low eccentric sensitivity but is compact and has an excellent optical capability.

To solve the problems described above, an imaging lens device according to the present invention is such an imaging lens device, comprising: a zoom lens system which comprises a plurality of lens units and changes gaps between the lens units to thereby generate an optical image of an object which can be optically and successively zoomed in and out; and an imaging sensor which converts an optical image generated by the zoom lens system into an electric signal, wherein the zoom lens system is such a zoom lens system which comprises a first unit having a negative power, a second unit having a positive power and a third unit having a positive power disposed in this order from the object side and changes gaps between the units for zooming, there is a aperture stop disposed between the first unit and the second unit, the second unit at least one comprises one cemented lens element, which is obtained by joining three lens elements, and one lens having a positive power at least, among the three lens elements which form the cemented lens element, one lens disposed on the object side directs a convex surface toward the object side while one lens disposed on the image surface side directs a concave surface toward the image surface side, and the following condition expressions are satisfied:

$$-0.2 < (R21-R24)/(R21+R24) < 1.0$$

$$0.6 < R21/Fw < 10.0$$

$$0.0 \leq h2\ ha4 < 1.0$$

where
- R21: a paraxial radius of curvature of the object side-lens surface of the cemented lens element,
- R24: a paraxial radius of curvature of the image surface side-lens surface of the cemented lens element,
- Fw: a focal length of the overall system at the wide-angle end,
- ha4: a distance from an optical axis of an intersection of a principal ray which is at 0.8× of a maximum half-angle of view ω at the wide-angle end and the image surface side-lens surface of the cemented lens element, h2: a distance from an optical axis of an intersection of a principal ray which is at 0.8× of a maximum half-angle of view ω at the wide-angle end and the outermost lens surface of the second unit toward the object side, and where a principal ray is a ray which propagates on the center of the aperture stop.

In a different aspect, the present invention is characterized in being directed to a digital camera which comprises the imaging lens device described above. Although the term "digital camera" used to exclusively refer to those which record still optical images, those digital cameras are not particularly distinguished these days from digital cameras which can also handle moving images, household digital video cameras and the like which have been proposed. Hence, as herein referred to, digital cameras include all cameras whose principal element is an imaging lens device comprising an imaging sensor of a digital still camera, a digital movie camera and the like which converts an optical image generated on a light receiving surface of the imaging sensor into an electric signal.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
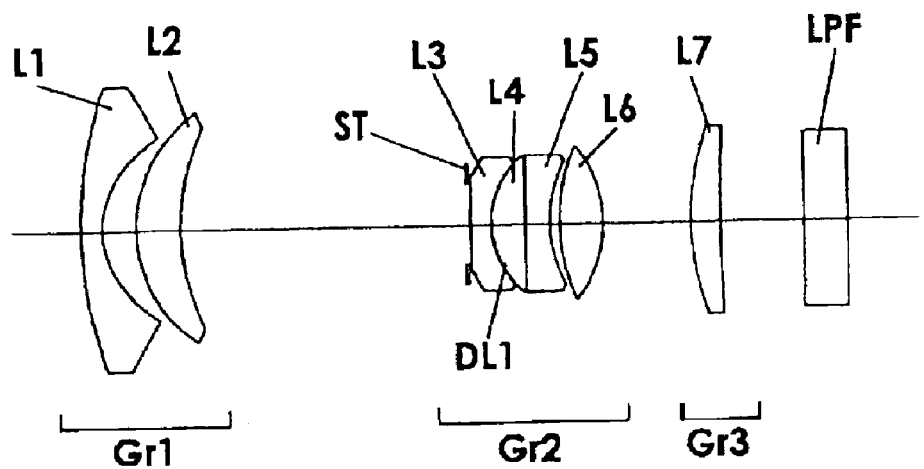
FIG. 1 is a lens construction view of a first embodiment (first example)
Figure 2:
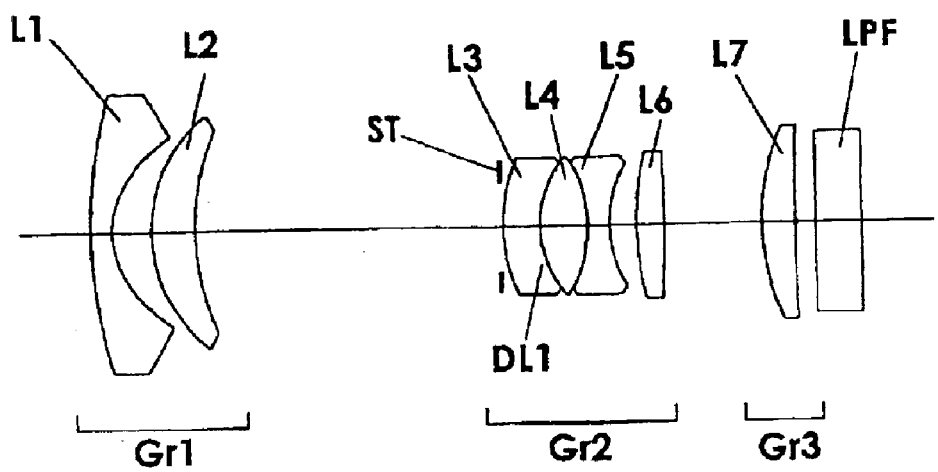
FIG. 2 is a lens construction view of a second embodiment (second example)
Figure 3:
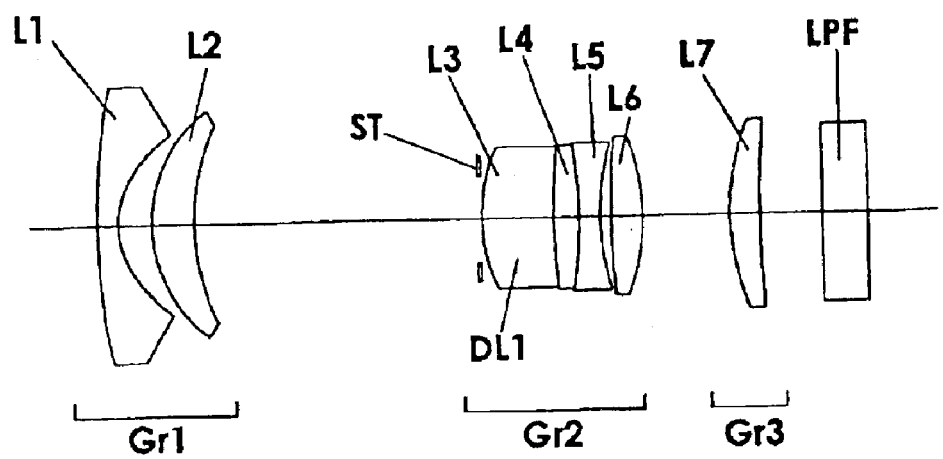
FIG. 3 is a lens construction view of a third embodiment (third example)
Figure 4:
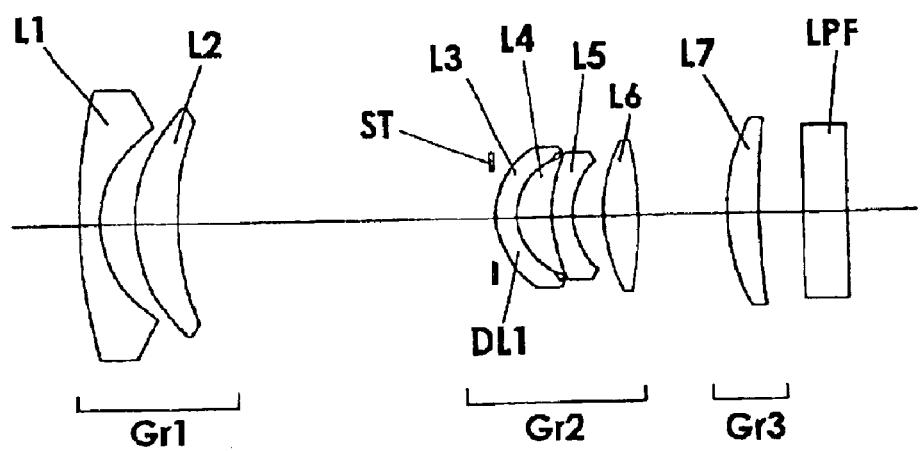
FIG. 4 is a lens construction view of a fourth embodiment (fourth example)
Figure 5:
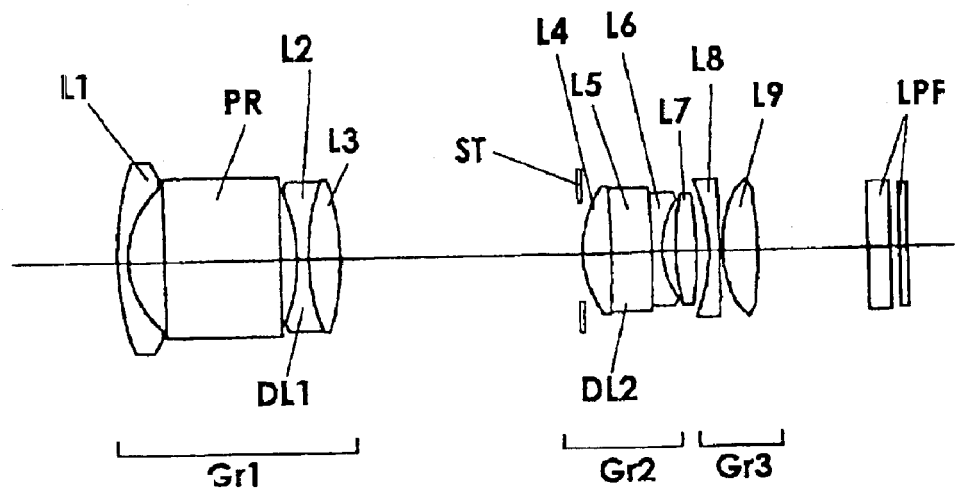
FIG. 5 is a lens construction view of a fifth embodiment (fifth example)
Figure 6:
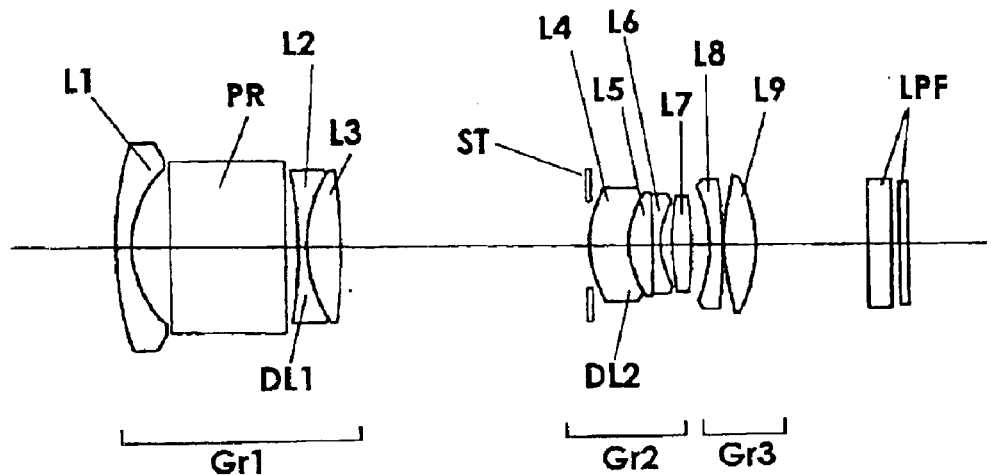
FIG. 6 is a lens construction view of a sixth embodiment (sixth example)
Figure 7:
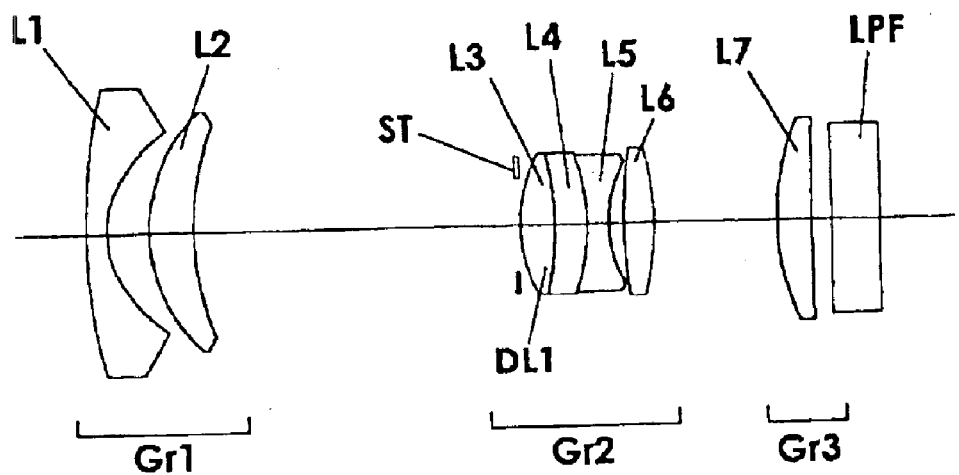
FIG. 7 is a lens construction view of a seventh embodiment (seventh example)
Figure 8:
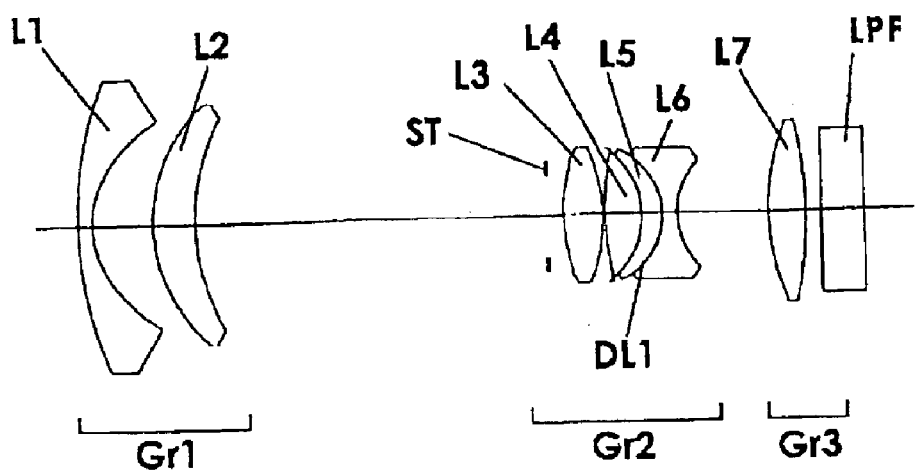
FIG. 8 is a lens construction view of an eighth embodiment (eighth example)
Figure 9:
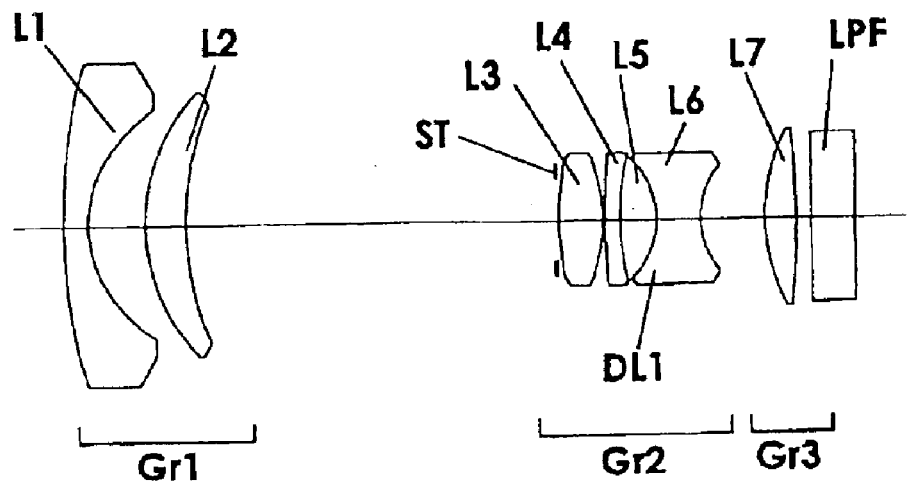
FIG. 9 is a lens construction view of a ninth embodiment (ninth example)
Figure 10:
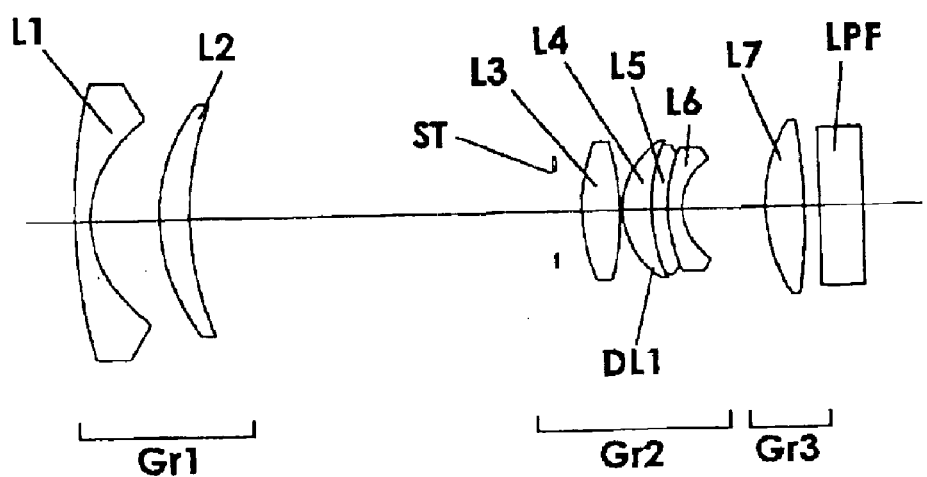
FIG. 10 is a lens construction view of a tenth embodiment (tenth example)
Figure 11:
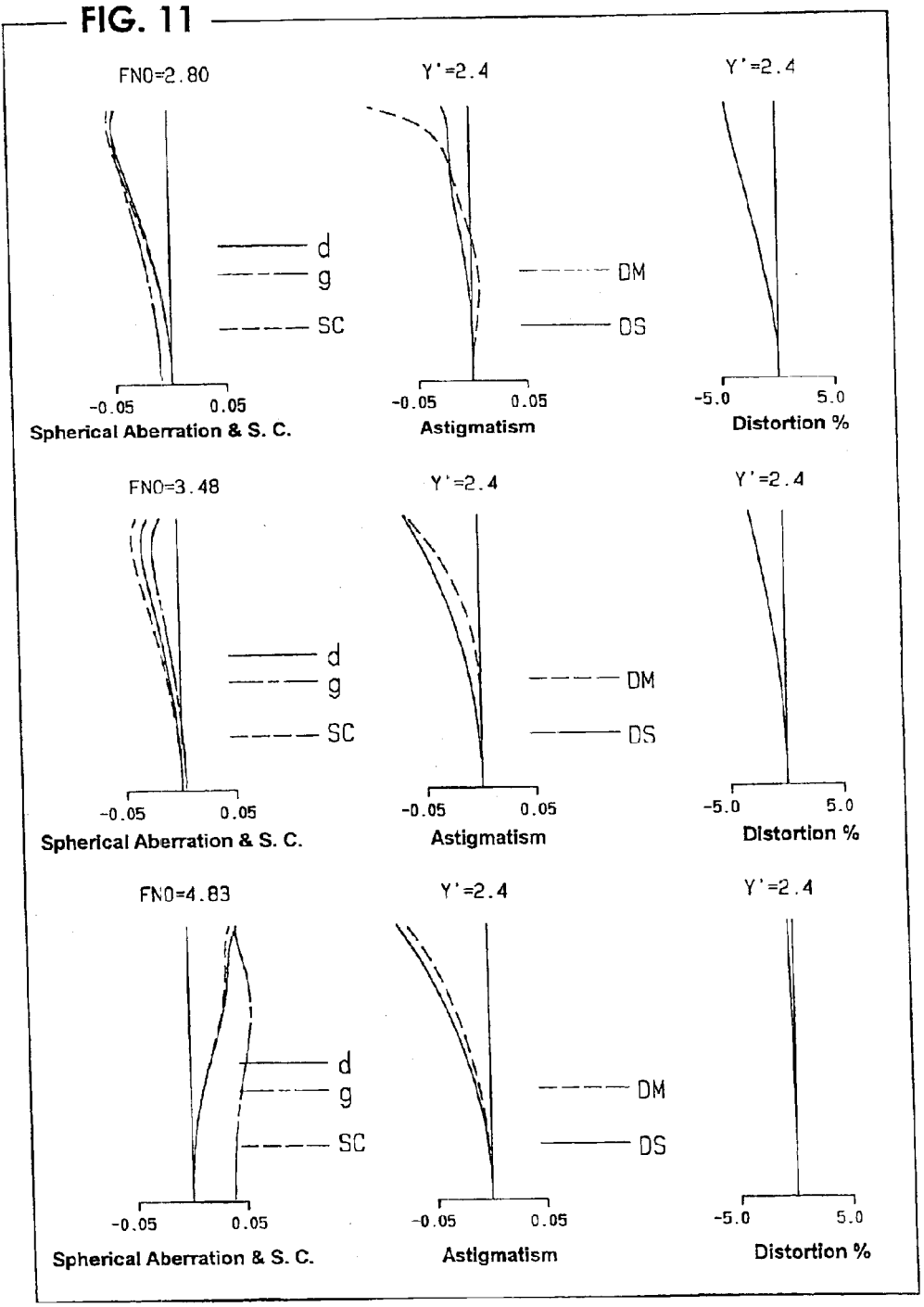
FIG. 11 is graphic representations of aberrations of the first embodiment in in-focus state at infinity.
Figure 12:
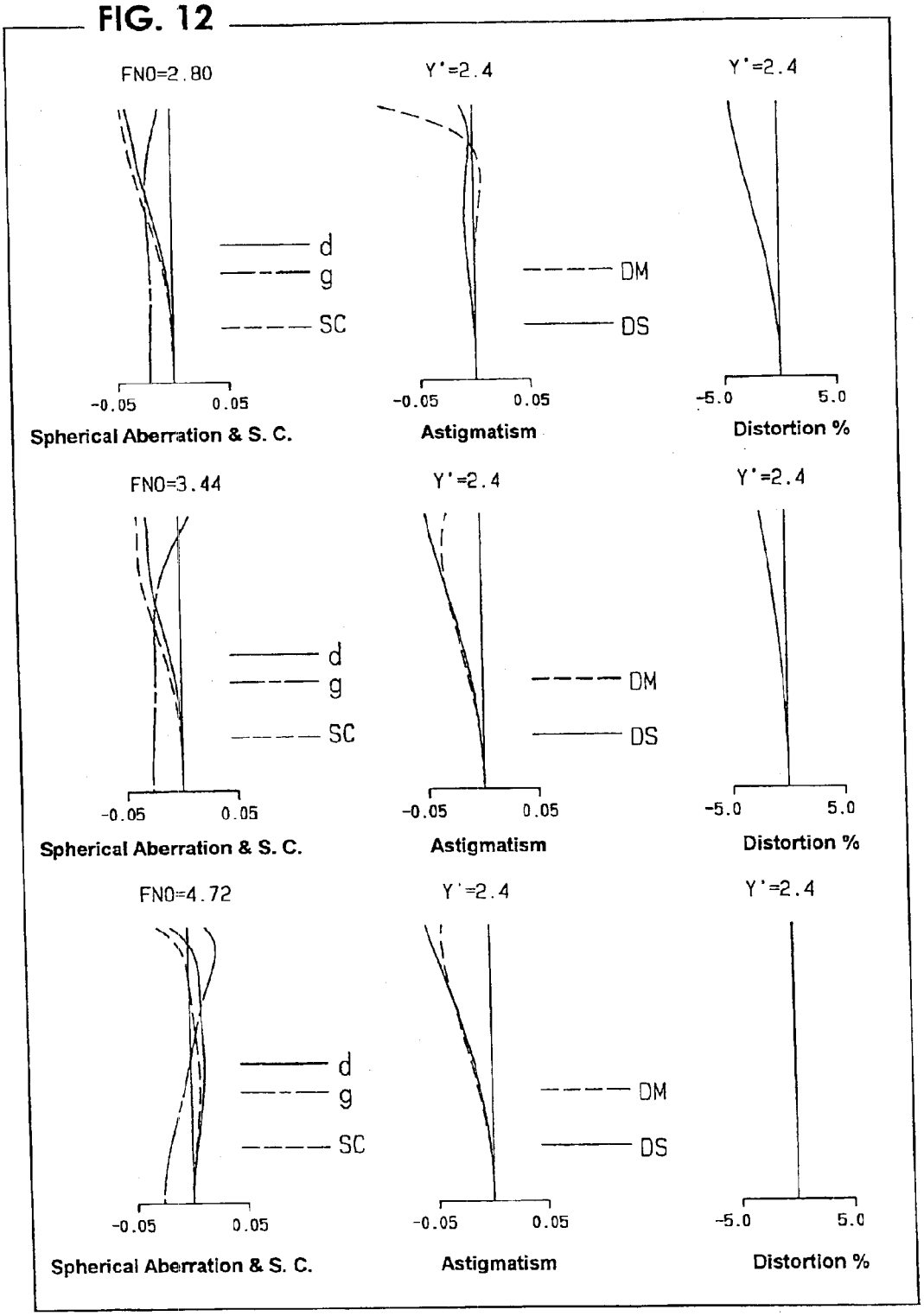
FIG. 12 is graphic representations of aberrations of the second embodiment in in-focus state at infinity.
Figure 13:
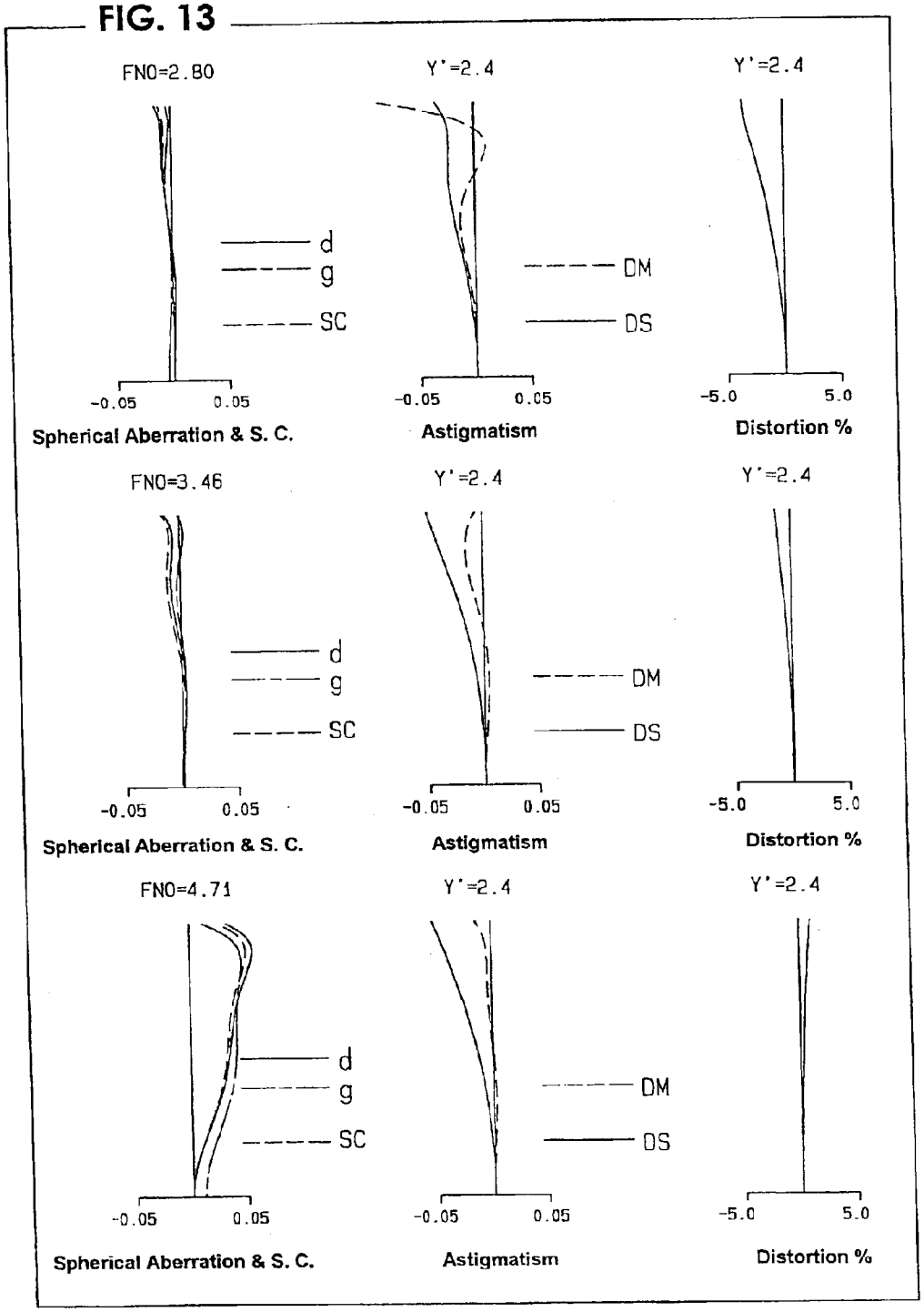
FIG. 13 is graphic representations of aberrations of the third embodiment in in-focus state at infinity.
Figure 14:
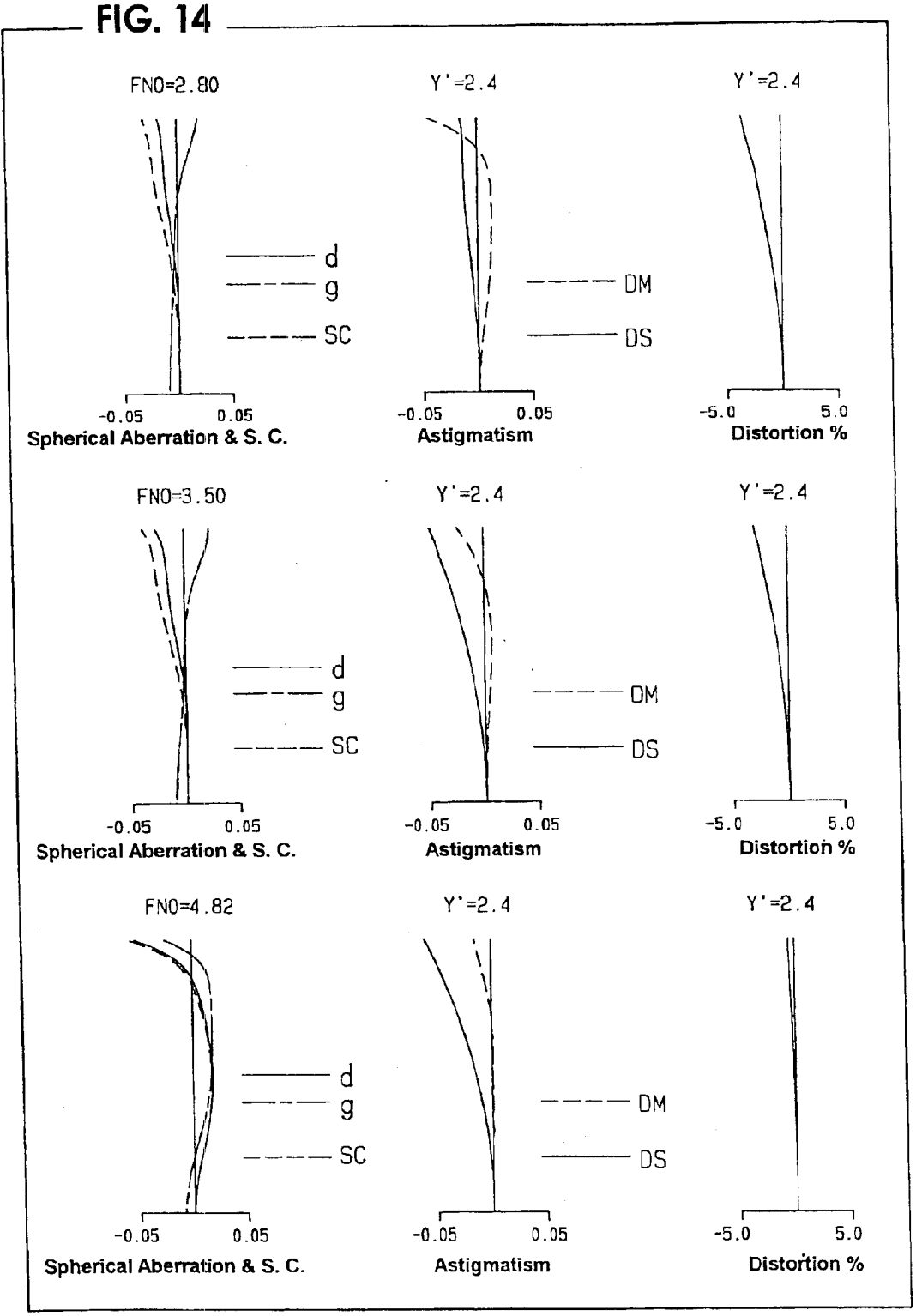
FIG. 14 is graphic representations of aberrations of the fourth embodiment in in-focus state at infinity.
Figure 15:
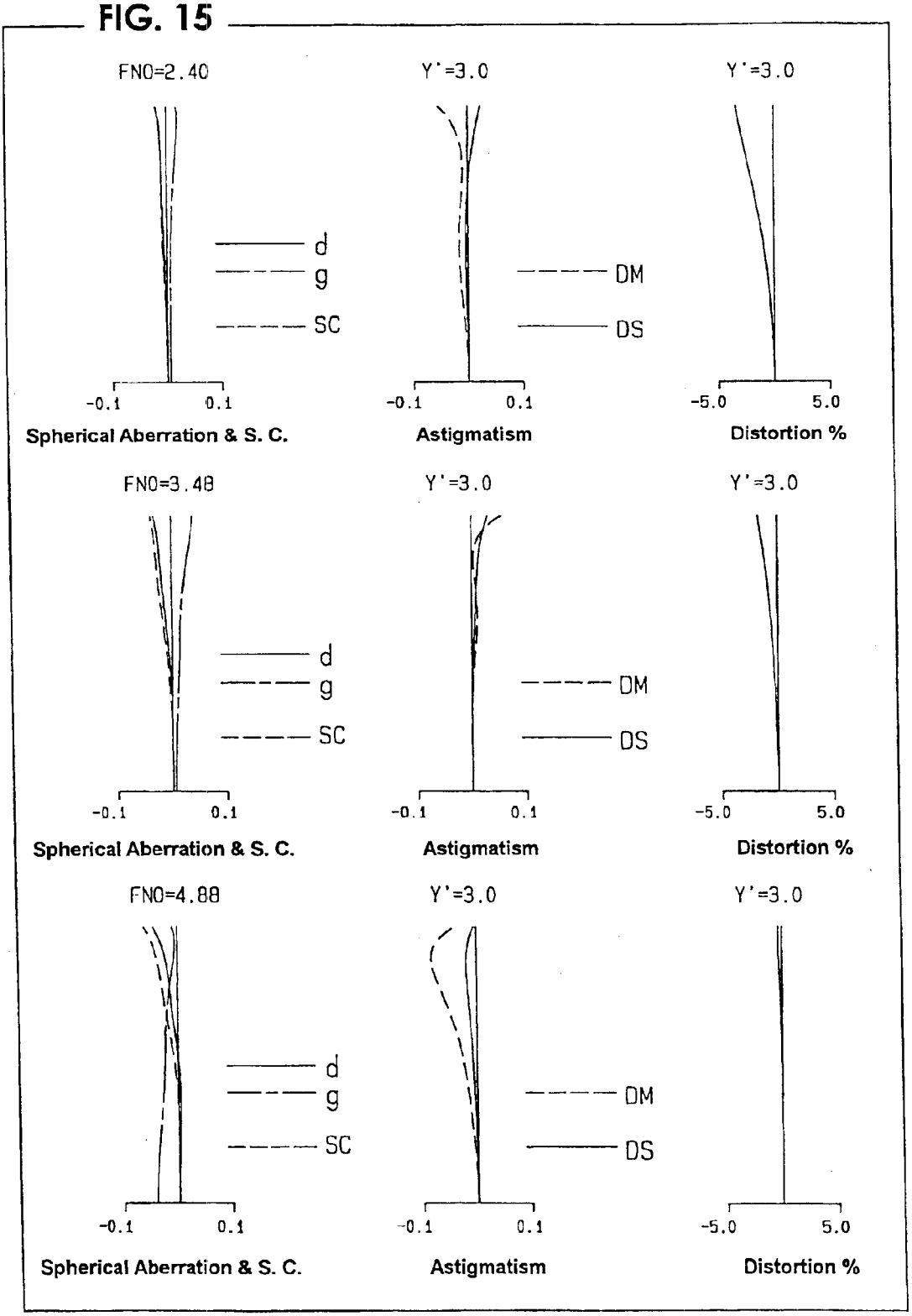
FIG. 15 is graphic representations of aberrations of the fifth embodiment in in-focus state at infinity.
Figure 16:
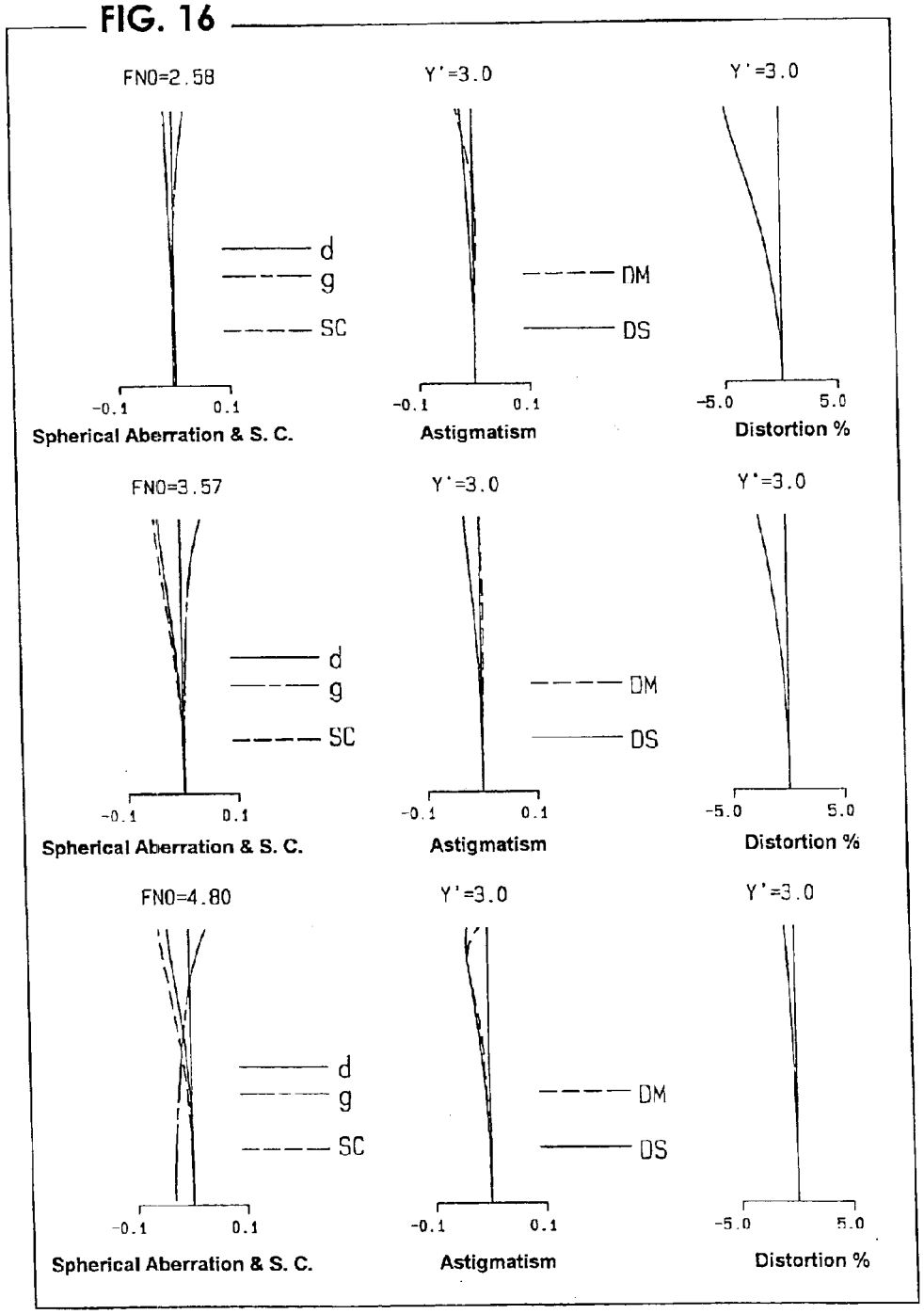
FIG. 16 is graphic representations of aberrations of the sixth embodiment in in-focus state at infinity.
Figure 17:
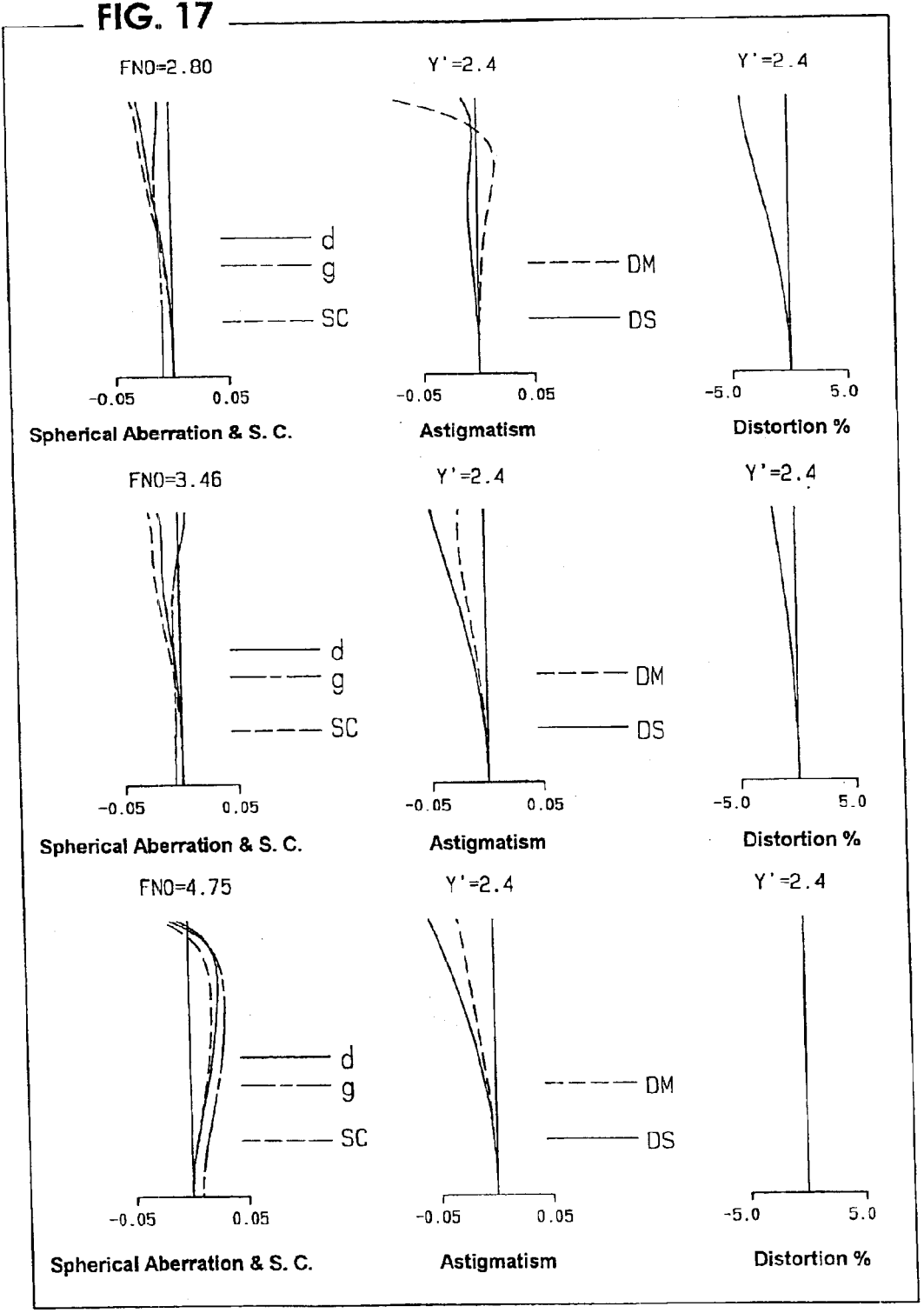
FIG. 17 is graphic representations of aberrations of the seventh embodiment in in-focus state at infinity.
Figure 18:
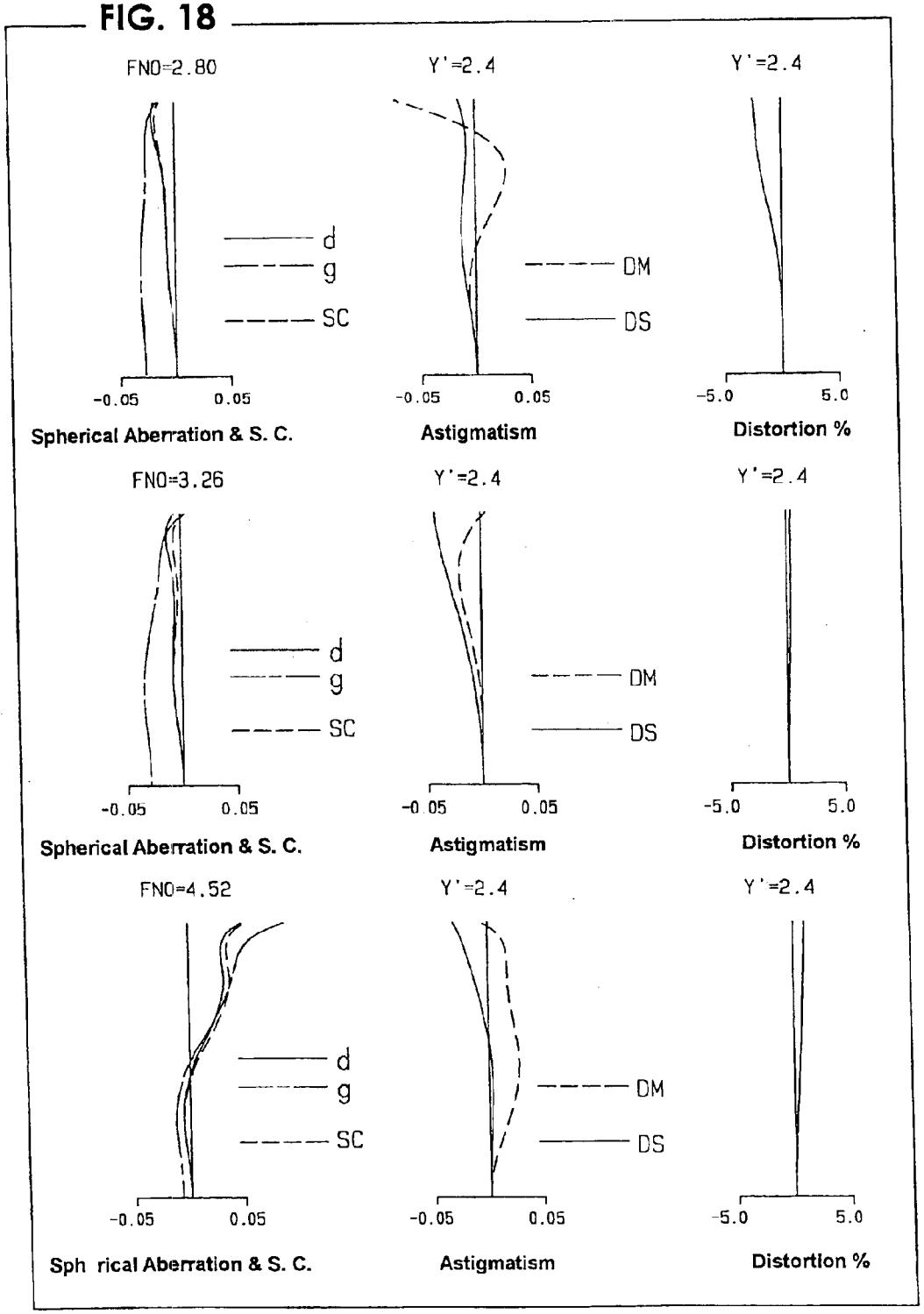
FIG. 18 is graphic representations of aberrations of the eighth embodiment in in-focus state at infinity.
Figure 19:
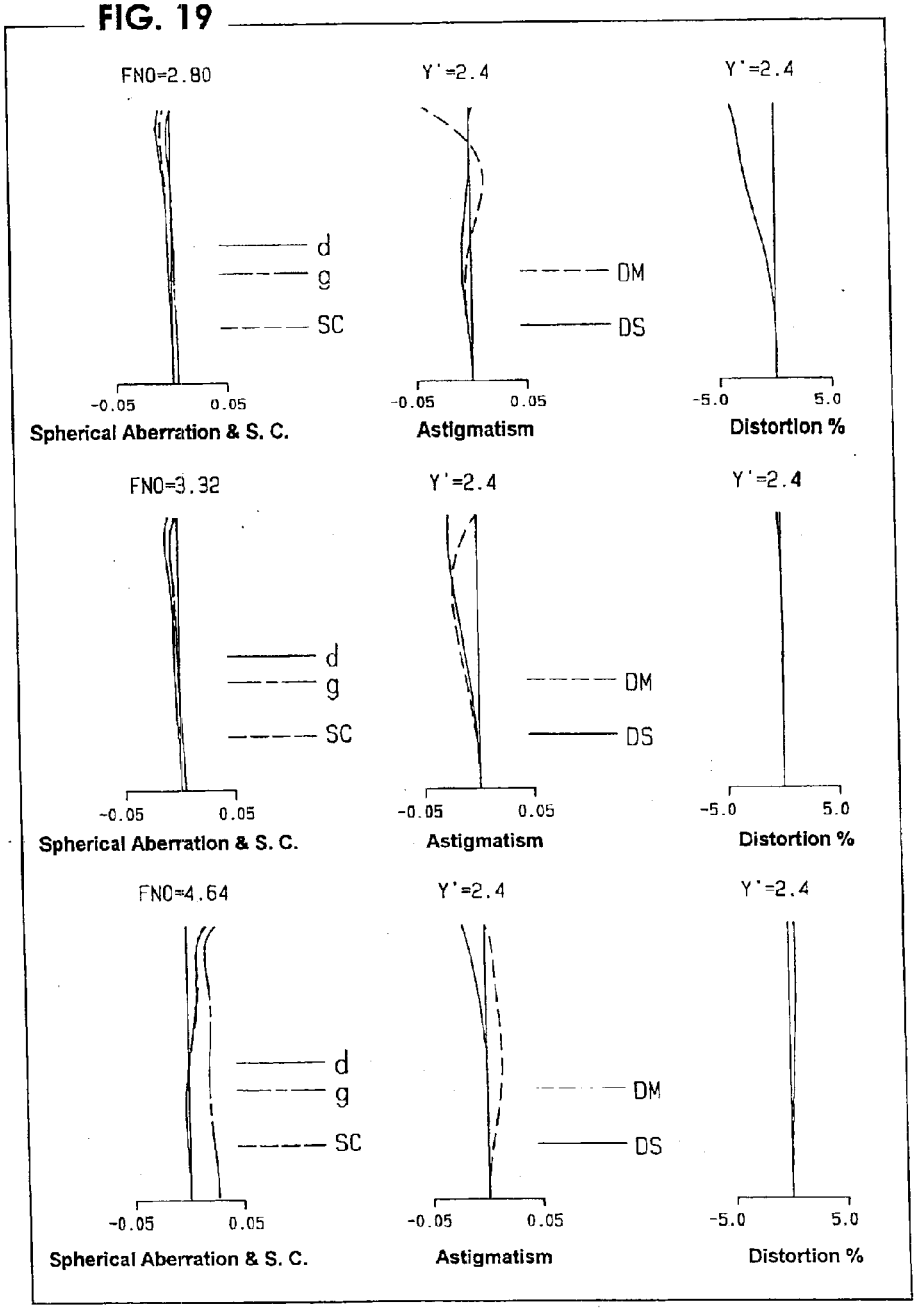
FIG. 19 is graphic representations of aberrations of the ninth embodiment in in-focus state at infinity.
Figure 20:
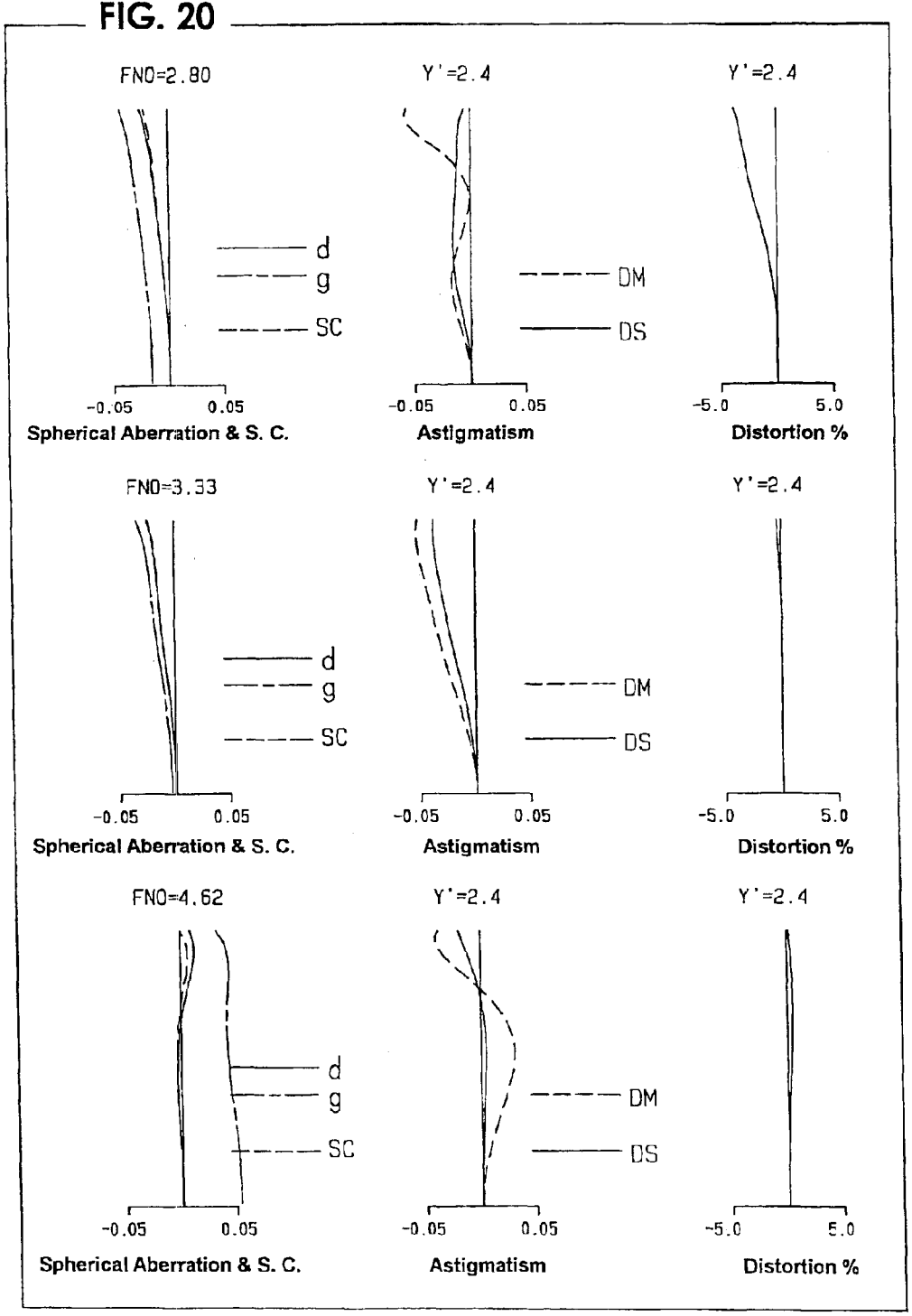
FIG. 20 is graphic representations of aberrations of the tenth embodiment in in-focus state at infinity.

Preferred embodiments of the present invention will now be described with reference to associated drawings. An imaging lens device which is one preferred embodiment of the present invention, as shown in FIG. 1 for instance, comprises a zoom lens system TL which generates an optical image of an object which can be zoomed in and out, an optical low pass filter LPF, and an imaging sensor SR which converts an optical image generated by the zoom lens system TL into an electric signal, all of which are disposed in this order from the object side. Further, the zoom lens system comprises a first lens unit Gr1 including a prism PR (FIG. 5) which internally comprises a reflection surface, and subsequent lens units. The imaging lens device is a principal element of a camera which is disposed within or externally attached to a digital camera, a video camera, a personal computer, a mobile computer, a cellular telephone, a PDA (personal digital assistance), etc.

The zoom lens system TL comprises a plurality of lens units including the first lens units Gr1, and is capable of changing the size of an optical image by changing gaps between the lens units. The first lens unit Gr1 has a negative power, and may internally comprise a prism PR which bends an optical axis of an object ray by about 90 degrees, in which case the apparent thickness can be reduced.

The optical low pass filter LPF has a particular cutoff frequency for adjusting a spatial frequency characteristic of the imaging lens system and eliminating a color moiré which is created in the imaging sensor. The optical low pass filter according to the preferred embodiment is a birefringent low pass filter which is obtained by stacking a birefringent material such as crystals whose crystal axes are aligned in a predetermined direction, a wavelength plate which changes a plane of polarization, and the like one atop the other. The optical low pass filter may be a phase-type low pass filter or the like which realizes a required optical characteristic related to a cutoff frequency by means of diffraction. The optical low pass filter is not essentially required. It is possible to omit the optical low pass filter by executing the other image processing method, such as electrically image processing method.

Figure 21:
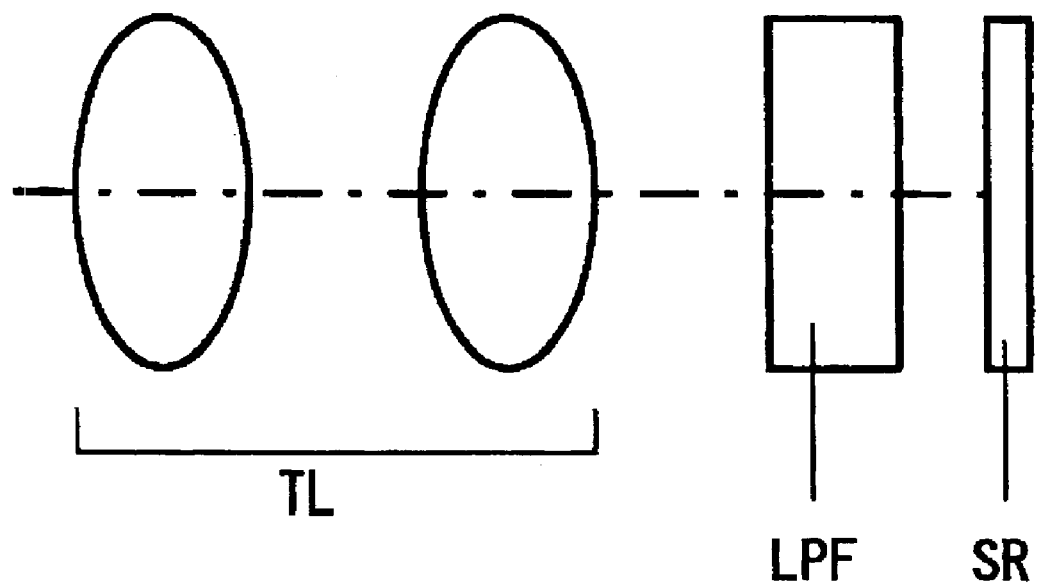
FIG. 21 is a construction view showing the present invention in outline.

The imaging sensor SR (FIG. 21) comprises a CCD having a plurality of pixels and converts an optical image generated by the zoom lens system into an electric signal using the CCD. The signal generated by the imaging sensor SR is recorded in a memory (e.g., a semiconductor memory, an optical disk) as a digital image signal after subjected to predetermined digital image processing, image compression processing and the like in accordance with a necessity, and is further transferred to other equipment via a cable or as it is converted into an infrared signal in some cases. The CCD may be replaced with a CMOS (Complementary Metal-oxide Semiconductor) sensor.

FIGS. 1 through 10 are drawings which show lens arrangements of zoom lens systems disposed in imaging lens devices according to the first preferred embodiment through a tenth preferred embodiment in a condition that the zoom lens systems are in a minimum focal length state. In all preferred embodiments, the zoom lens system is a 3-component type zoom lens system which comprises a first unit Gr1 having a negative power, a second unit Gr2 having a positive power and a third unit Gr3 having a negative power in this order from the object side and changes gaps between the units for zooming. Further, in each embodiment, a parallel flat plate LPF which is outermost toward the image side belongs to a filter category including an optical low pass filter.

In the zoom lens system according to the first preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST, a cemented lens element DL1 (La), which comprises a negative meniscus lens element L3 (La1) which has an aspheric surface, directed toward the object side and which convex toward the object side, a positive lens element L4 (La2) whose both surfaces are convex surfaces and a negative lens element L5 (La3) whose both surfaces are concave surfaces, and a positive lens element L6 (Lb) whose both surfaces are convex surfaces. The third unit Gr3 comprises a positive meniscus lens element L7 which is convex toward the object side.

In the zoom lens system according to the second preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST, a cemented lens element DL1 (La), which comprises a negative meniscus lens element L3 (La1) which has an aspheric surface directed toward the object side and which is convex toward the object side, a positive lens element L4 (La2) whose both surfaces are convex surfaces and a negative lens element L5 (La3) whose both surfaces are concave surfaces, and a positive lens element L6 (Lb) which has an aspheric surface directed toward the image side and whose both surfaces are convex surfaces. The third unit Gr3 comprises a positive meniscus lens element L7 which is convex toward the object side.

In the zoom lens system according to the third preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST, a cemented lens element DL1 (La), which comprises a positive meniscus lens element L3 (La1) which has an aspheric surface directed toward the object side and which is convex toward the object side, a positive lens element L4 (La2) whose both surfaces are convex surfaces and a negative lens element L5 (La3) whose both surfaces are concave surfaces, and a positive lens element L6 (Lb) whose both surfaces are convex surfaces. The third unit Gr3 comprises a positive meniscus lens element L7 which has an aspheric surface directed toward the object side and is convex toward the object side.

In the zoom lens system according to the fourth preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST, a cemented lens element DL1 (La), which comprises a negative meniscus lens element L3 (La1) which has an aspheric surface directed toward the object side and which is convex toward the object side, a positive meniscus lens element L4 (La2) which is convex toward the object side and a negative meniscus lens element L5 (La3) which is convex toward the object side, and a positive lens element L6 (Lb) whose both surfaces are convex surfaces. The third unit Gr3 comprises a positive meniscus lens element L7 which is convex toward the object side.

In the zoom lens system according to the fifth preferred embodiment, the first unit Gr1 comprises a negative meniscus lens element L1 which has aspheric surfaces on the both sides and which is convex toward the object side, a prism PR which bends an optical axis of an object ray by about 90 degrees (A reflection surface is not shown in the drawing.), and a cemented lens element DL1 which comprises a negative lens element L2 whose both surfaces are concave surfaces and a positive lens element L3 whose both surfaces are convex surfaces. The second unit Gr2 comprises an aperture stop ST, a cemented lens element DL2 (La), which comprises a positive lens element L4 (La1) which has an aspheric surface directed toward the object side and whose both surfaces are convex surfaces, a negative meniscus lens element L5 (La3) which is convex toward the image side and a negative lens element L6 (La3) whose both surfaces are concave surfaces, and a positive lens element L7 (Lb) whose both surfaces are convex surfaces. The third unit Gr3 comprises a negative meniscus lens element L8 which is convex toward the image side and a positive lens element L9 which has aspheric surfaces on the both sides and whose both surfaces are convex surfaces.

In the zoom lens system according to the sixth preferred embodiment, the first unit Gr1 comprises a negative meniscus lens element L1 which has aspheric surfaces on the both sides and which is convex toward the object side, a prism PR which bends an optical axis of an object ray by about 90 degrees (A reflection surface is not shown in the drawing.), and a cemented lens element DL1 which comprises a negative lens element L2 whose both surfaces are concave surfaces and a positive lens element L3 whose both surfaces are convex surfaces. The second unit Gr2 comprises an aperture stop ST, a cemented lens element DL2 (La), which comprises a positive lens element L4 (La1) which has an aspheric surface directed toward the object side and which is convex toward the object side, a positive lens element L5 (La2) whose both surfaces are convex surfaces and a negative lens element L6 (La3) whose both surfaces are concave surfaces, and a positive lens element L7 (Lb) whose both surfaces are convex surfaces. The third unit Gr3 comprises a negative meniscus lens element L8 which is convex toward the image side and a positive lens element L9 which has aspheric surfaces on the both sides and whose both surfaces are convex surfaces.

In the zoom lens system according to the seventh preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST, a cemented lens element DL1 (La), which comprises a positive lens element L3 (La1) which has an aspheric surface directed toward the object side and whose both surfaces are convex surfaces, a positive meniscus lens element L4 (La2) which is convex toward the image side and a negative lens element L5 (La3) whose both surfaces are concave surfaces, and a positive lens element L6 (Lb) whose both surfaces are convex surfaces. The third unit Gr3 comprises a positive meniscus lens element L7 which is convex toward the object side.

In the zoom lens system according to the eighth preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST and a cemented lens element DL1 (La) which comprises a positive lens element L3 (Lb) which has an aspheric surface directed toward the object side and whose both surfaces are convex surfaces, a positive meniscus lens element L4 (La1) whose both surfaces are convex surfaces, a positive meniscus lens element L5 (La2) which is convex toward the image side and a negative lens element L6 (La3) whose both surfaces are concave surfaces. The third unit Gr3 comprises a positive lens element L7 whose both surfaces are convex surfaces.

In the zoom lens system according to the ninth preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST and a cemented lens element DL1 (La) which comprises a positive lens element L3 (Lb) which has an aspheric surface directed toward the object side and whose both surfaces are convex surfaces, a negative lens element L4 (La2) which is convex toward the object side, a positive lens element L5 (La2) whose both surfaces are convex surfaces and a negative lens element L6 (La3) whose both surfaces are concave surfaces. The third unit Gr3 comprises a positive lens element L7 whose both surfaces are convex surfaces.

In the tenth preferred embodiment, the first unit Gr1 comprises a negative meniscus lens element L1 which has an aspheric surface directed toward the image side and which is convex toward the object side and a positive meniscus lens element L2 which is convex toward the object side. The second unit Gr2 comprises an aperture stop ST and a cemented lens element DL1 (La) which comprises a positive lens element L3 (Lb) which has an aspheric surface directed toward the object side and whose both surfaces are convex surfaces, a positive meniscus meniscus lens element L4 (La1) which is convex toward the object side, a negative meniscus lens element L5 (La2) which is convex toward the object side and a negative meniscus lens element L6 (La3) which is convex toward the object side. The third unit Gr3 comprises a positive lens element L7 whose both surfaces are convex surfaces.

As described above, the zoom lens system according to each preferred embodiment is a zoom lens system which comprises the first unit Gr1 having a negative power, the second unit Gr2 having a positive power and the third unit Gr3 having a positive power and which changes gaps between the units for zooming, there is the aperture stop ST which restricts an on-axial luminous flux disposed between the first unit Gr1 and the second unit Gr2, and at least the second unit Gr2 comprises one cemented lens element La which is obtained by joining the three lens elements La1, La2 and La3 and one lens element Lb having a positive power. Of the three lens elements which form the cemented lens element La, the lens element La1 which is on the object side has a convex surface directed toward the object side, while the lens element La3 which is on the image surface side has a concave surface directed toward the image surface side.

Having the structures described above, the zoom lens systems according to the respective preferred embodiments further satisfy the following condition expressions:

$$-0.2 < (R21 R24)/(R21+R24) < 1.0 \quad (1)$$

$$0.6 < R21 / Fw < 10.0 \quad (2)$$

$$0.0 \leq h2/ha4 < 1.0 \quad (3)$$

where
R21: a paraxial radius of curvature of the object side-lens surface of the cemented lens element,
R24: a paraxial radius of curvature of the image surface side-lens surface of the cemented lens element,
Fw: a focal length of the overall system at the wide-angle end,
ha4: a distance from an optical axis of an intersection of a principal ray which is at 0.8× of a maximum half-angle of view ω at the wide-angle end and the image surface side-lens surface of the cemented lens element,
h2: a distance from an optical axis of an intersection of a principal ray which is at 0.8× of a maximum half-angle of view ω at the wide-angle end and the outermost lens surface of the second unit toward the object side,
and where a principal ray is a ray which propagates on the center of the aperture stop.

Since these condition expressions are satisfied and owing to the structures described above, an aberration is corrected favorably particularly within the second unit Gr2, the optical system causes less change in aberration even during zooming, an eccentric sensitivity within the second unit Gr2 is suppressed, and adjustments during assembly are easy.

Of these condition expressions, the condition expression (1) is for optimization of the shape of the cemented lens element La. When the cemented lens element La exceeds the upper limit value appearing in the condition expression (1), a spherical aberration, a coma and the like become excessively large in the cemented lens element La, it becomes difficult to correct an aberration and the thickness of the cemented lens element La along an optical axis direction increases, which is not desirable. On the contrary, when the cemented lens element La falls short of the lower limit value appearing in the condition expression (1), the Petzval's sum in the second unit Gr2 becomes large, which makes it difficult to correct a curvature of field. As for the condition expression (1), it is preferable that any one of the following relationships is satisfied for a further improvement of the effect described above:

$$0.0 < (R21-R24)(R21+R24) \quad (1)'$$

$$(R21-R24)/(R21+R24) < 0.3 \quad (1)''$$

Meanwhile, the condition expression (2) is for optimization of the radius of curvature of the outermost lens surface of the cemented lens element La toward the object side. When the cemented lens element La falls short of the lower limit value appearing in the condition expression (2), an eccentric sensitivity of La becomes too high, which is not desirable. On the contrary, when the cemented lens element La exceeds the upper limit value appearing in the condition expression (2), the total length becomes long and it is not therefore possible to obtain a compact zoom lens system. As for the condition expression (2), it is preferable that any one of the following relationships is satisfied for a further improvement of the effect described above:

$$1.0 < R21/Fw \quad (2)'$$

$$R21/Fw < 3.0 \quad (2)''$$

The condition expression (3) is for restricting the height at which a principal ray travels within the second unit, and when the cemented lens goes outside the range defined above, it becomes difficult to correct an astigmatism. As for the condition expression (3), it is preferable that the following relationship is satisfied for a further improvement of the effect described above:

$$0.0 \leq h2/ha4 < 0.5 \tag{3}'$$

It is further preferable to satisfy the following condition expressions described below, in addition to the condition expressions above.

It is desirable that the zoom lens system according to each preferred embodiment satisfies the following condition expression (4) below:

$$-0.7 < fb/fa < 1.2 \tag{4}$$

where fa: a focal length of the cemented lens element La, and fb: a focal length of the lens element Lb which has a positive power.

The condition expression (4) expresses an optimal range of a ratio of the focal length of the lens element Lb to the focal length of the cemented lens element La. When the lens elements fall short of the lower limit value appearing in the condition expression (4), a relative eccentric sensitivity of the cemented lens element La and the lens element Lb becomes high, which is not desirable. On the contrary, when the lens elements exceed the upper limit value, it becomes difficult to correct a spherical aberration, a coma, etc., the gap between the cemented lens element La and the lens element Lb increases, and a compact zoom lens system cannot be therefore obtained. As for the condition expression (4), it is preferable that any one of the following relationships is satisfied for a further improvement of the effect described above:

$$0.1 < fb/fa \tag{4}'$$

$$fb/fa < 0.5 \tag{4}''$$

As in the zoom lens system according to each preferred embodiment, the lens element La3 preferably has a negative power and is characterized in satisfying the following condition expression:

$$23 < (Nd-1)/(NF-NC) < 45 \tag{5}$$

where

Nd: a refractive index of the lens element La3 at the d-line (587.56 nm),

NF: a refractive index of the lens element La3 at the F-line (486.13 nm), and

NC: a refractive index of the lens element La3 at the C-line (656.28 nm).

The condition expression (5) is for optimization of the Abbe's number of the lens element La3 which is outermost to the image surface side among the three lens elements which form the cemented lens element La described earlier. When the lens goes beyond the upper limit value and the lower limit value appearing in the condition expression (5), a chromatic aberration becomes too large and it becomes difficult to correct a chromatic aberration.

In the zoom lens system according to each preferred embodiment, it is desirable that the outermost lens surface of the second unit Gr2 toward the object side is an aspheric surface. Such a structure makes it possible to favorably correct a spherical aberration, a coma and the like which develop at this lens surface, and therefore, is effective in suppressing a change in aberration due to an eccentric sensitivity, a core thickness error, etc. On the contrary, when an aspheric surface is provided at the outermost lens surface of the cemented lens element La toward the image side or one of the lens elements of the second unit Gr2 which is on the image side, it is possible to favorably correct an off-axis aberration.

Further, it is desirable that the first unit Gr1 has a doublet structure comprising a negative meniscus lens which has an aspheric surface and is convex toward the object side and a positive meniscus lens which is convex toward the object side as in the zoom lens systems according to the first through the fourth and the seventh through the tenth preferred embodiments. Such a structure is simple and advantageously reduces the size. Alternatively, the first unit Gr1 may have a structure that two negative lens elements and one positive lens are used and at least one lens has an aspheric surface as in the zoom lens systems according to the fifth and the sixth preferred embodiments, in which case it is possible to move favorably correct an aberration. In addition, when the first unit Gr1 comprises two negative lens elements and one positive lens, any lens elements may be joined to each other.

Further, it is desirable that the aperture stop ST is disposed in front of the second unit Gr2 and moved as one unit together with the second unit Gr2 as in the zoom lens system according to each preferred embodiment. Such a structure is desirable in that it simplifies a mechanism of holding an aperture stop member. In terms of optical capabilities, too, this structure allows to favorably maintain a telecentric characteristic and align the imaging sensor to the location of a pupil.

As in the zoom lens system according to each preferred embodiment, it is desirable that the lens element Lb of the second unit Gr2 is a single lens whose both surfaces are convex surfaces. Such a structure permits to suppress an eccentric sensitivity without deteriorating an imaging capability. Further, since a single lens is used, this structure is preferable in an effort to reduce the size and lower the price.

It is desirable that the third unit Gr3 comprises one lens or two as in the zoom lens system according to each preferred embodiment, since this unit is close to the imaging surface and a sensitivity at an aberration-creating surface is relatively low. Such a structure is simple and realizes a compact zoom lens system. In addition, when the third unit Gr3 uses a plastic lens, a cost reduction is better attained. While a plastic lens generally has a problem that birefringence is intense and deteriorates an imaging capability, use within the third unit Gr3 which is located relatively close to the image surface permits a plastic lens to exert only a minor influence.

In the zoom lens systems according to the fifth and the sixth preferred embodiments, the first unit comprises the prism PR which has a reflection surface so as to bend an optical axis of an object ray by about 90 degrees. Such a structure that a reflection surface bends an optical axis of an object ray by about 90 degrees, unlike a zoom lens of the collapsible mount type, allows to reduce the size of the imaging lens device in the thickness direction down to the size from the outermost lens toward the object side to the reflection surface both during use and nonuse, and therefore, is desirable as the apparent thickness of the imaging lens device is thin. In addition, owing to the structure that the reflection surface bends an optical axis of an object ray by about 90 degrees, it is possible to overlay optical paths of object rays with each other in the vicinity of the reflection surface, effectively use the space and further reduce the size of the imaging lens device.

While the reflection surface may either be (a) an internal reflection prism (as in the preferred embodiments), ((b) an internal reflection flat plate mirror or (c) a surface reflection mirror, use of (a) an internal reflection prism is most suitable. When an internal reflection prism is used, an object ray passes through a medium, and hence, an equivalent inter-surface gap at the time of passage through the prism is shorter than an actual gap in accordance with a refractive index of the medium. Use of an internal reflection prism as the reflection surface, therefore, realizes an optically equivalent structure even in a more compact space, which is desirable.

When the first unit comprises the prism PR which has a reflection surface so as to bend an optical axis of an object ray by about 90 degrees, it is desirable to fix the first unit relative to the imaging sensor. With the first unit fixed, a lens-barrel structure which holds the respective lens elements is simplified and a thin imaging lens device whose total length does not change during zooming is accordingly obtained.

While each lens unit of each preferred embodiment comprises only refracting lens elements which deflect an incident ray by means of refraction (that is, lens elements in which deflection occurs at an interface between mediums which have different refractive indices from each other), this is not limiting. For instance, each lens unit may comprise diffracting lens elements which deflect an incident ray by means of diffraction, refraction/diffraction hybrid lens elements which deflect an incident ray by means of a combination of diffraction and refraction, refractive index distribution lens elements which deflect an incident ray by means of a refractive index distribution within a medium, or the like.

A structure and the like of a zoom lens system installed in an imaging lens device to which the present invention is applied will now be described more specifically with reference to construction data, aberration diagrams, etc. A first through a tenth examples described below correspond respectively to the first preferred embodiment through the tenth preferred embodiment described above, and lens structure diagrams (FIGS. 1 through 10) representing the first through the tenth preferred embodiments respectively show lens structures according to the first through the tenth examples.

With respect to construction data regarding the respective examples, ri (i=1, 2, 3, . . . ) denotes a radius of curvature (mm) of an i-th surface from the object side, di (i=1, 2, 3, . . . ) denotes an i-th on-axial inter-surface gap (mm) from the object side, and Ni (i=1, 2, 3, . . . ) and vi (i=1, 2, 3, . . . ) denote a refractive index (Nd) and the Abbe's number (vd) of an i-th optical element from the object side to the d-line. Further, among the construction data, an on-axial inter-surface gap which changes during zooming represents a value of variable gap which changes between a minimum focal length state (wide-angle end), an intermediate focal length state (middle) and a maximum focal length state (telephoto end). A focal length (f, mm) and the F-number (FNO) of the entire system in each one of the focal length states (wide-angle end), (middle) and (telephoto end) are shown together with other data.

When the symbol * is added to ri which is the symbol for the radius of curvature, this surface is an aspheric surface whose shape is defined by the following formula (AS).

Aspheric surface data according to the respective examples are shown together with other data.

$$x = \frac{C_0 y^2}{1 + \sqrt{1 - \varepsilon C_0^2 y^2}} + \Sigma A i y^i \quad AS$$

where, x represents the shape (mm) of the aspherical surface (i.e., the displacement along the optical axis at the height y in a direction perpendicular to the optical axis of the aspherical surface), Co represents the curvature (mm$^{-1}$) of the reference aspherical surface of the aspherical surface, y represents the height in a direction perpendicular to the optical axis, $\varepsilon$ represents the quadric surface parameter, and Ai represents the aspherical coefficient of order i.

<Example 1>
f = 3.7–6.4–11.0
Fno. = 2.80–3.48–4.83

| [Radius of Curvature] | [Axial Distance] | [Refractive Index (nd)] | [Abbe Number (vd)] |
|---|---|---|---|
| r1 = 16.705 | | | |
| | d1 = 0.800 | N1 = 1.77377 | v1 = 47.17 |
| r2* = 3.391 | | | |
| | d2 = 1.322 | | |
| r3 = 5.368 | | | |
| | d3 = 1.754 | N2 = 1.84666 | v2 = 23.78 |
| r4 = 8.849 | | | |
| | d4 = 11.278–4.711–1.500 | | |
| r5 = INF(ST) | | | |
| | d5 = 0.100 | | |
| r6* = 25.241 | | | |
| | d5 = 0.800 | N3 = 1.48749 | v3 = 70.44 |
| r7 = 3.517 | | | |
| | d6 = 1.317 | N4 = 1.80610 | v4 = 40.72 |
| r8 = −108.976 | | | |
| | d7 = 0.902 | N5 = 1.84666 | v5 = 23.78 |
| r9 = 5.054 | | | |
| | d8 = 0.380–7.938–15.835 | | |
| r10 = 7.436 | | | |
| | d10 = 1.683 | N6 = 1.48749 | v6 = 70.44 |
| r11 = −4.738 | | | |
| | d11 = 3.380–7.938–15.835 | | |
| r12 = 10.056 | | | |
| | d12 = 1.148 | N7 = 1.61800 | v7 = 63.39 |
| r13 = 59.062 | | | |
| | d13 = 3.236–2.639–0.562 | | |
| r14 = INF | | | |
| | d14 = 1.700 | N8 = 1.51680 | v8 = 64.20 |
| r15 = INF | | | |

[Aspherical Coefficient]
r2*
$\varepsilon$ = 0.19470
A4 = 0.11620E − 02
A6 = 0.95462E − 05
A8 = 0.20237E − 05
A10 = −0.2884E − 07
r6*
$\varepsilon$ = −203.29
A4 = −0.83358E − 03
A6 = −0.31617E − 03

-continued

```
A8 = −0.12511E − 04
A10 = 0.15435E − 04
A12 = −0.35460E − 05
```

<Example 2>
f = 3.7–6.4–11.0
Fno. = 2.80–3.44–4.72

| [Radius of Curvature] | [Axial Distance] | [Refractive Index (nd)] | [Abbe Number (vd)] |
|---|---|---|---|
| r1 = 18.622 | | | |
| | d1 = 0.800 | N1 = 1.80420 | v1 = 46.50 |
| r2* = 3.415 | | | |
| | d2 = 1.446 | | |
| r3 = 5.592 | | | |
| | d3 = 1.65193 | N2 = 1.84666 | v2 = 23.78 |
| r4 = 9.598 | | | |
| | d4 = 11.539–4.782–1.500 | | |
| r5 = INF(ST) | | | |
| | d5 = 0.100 | | |
| r6* = 6.033 | | | |
| | d6 = 1.344 | N3 = 1.80518 | v3 = 25.46 |
| r7 = 3.937 | | | |
| | d7 = 1.768 | N4 = 1.80420 | v4 = 46.50 |
| r8 = −4.807 | | | |
| | d8 = 0.800 | N5 = 1.59270 | v5 = 35.45 |
| r9 = 4.664 | | | |
| | d9 = 0.986 | | |
| r10 = 11.144 | | | |
| | d10 = 1.017 | N6 = 1.58913 | v6 = 61.25 |
| r11* = −33.891 | | | |
| | d11 = 3.643–6.446–12.546 | | |
| r12 = 8.711 | | | |
| | d12 = 1.248 | N7 = 1.61800 | v7 = 63.39 |
| r13 = 89.713 | | | |
| | d13 = 0.75770 | | |
| r14 = INF | | | |
| | d14 = 1.70000 | N8 = 1.51680 | v8 = 64.20 |
| r15 = INF | | | |

[Aspherical Coefficient]
```
r2
ε = 0.16362
A4 = 0.10888E − 02
A6 = 0.22967E − 04
A8 = 0.77583E − 06
A10 = −0.14352E − 07
r6
ε = 1.1149
A4 = −0.93987E − 03
A6 = 0.23171E − 04
A8 = −0.19816E − 04
A10 = 0.23207E − 05
r11
ε = −26.231
A4 = 0.37264E − 03
A6 = 0.70165E − 04
A8 = −0.20813E − 05
A10 = −0.18058E − 05
A12 = 0.19225E − 06
```

<Example 3>
f = 3.7–6.4–11.0
Fno. = 2.80–3.46–4.71

| [Radius of Curvature] | [Axial Distance] | [Refractive Index (nd)] | [Abbe Number (vd)] |
|---|---|---|---|
| r1 = 26.372 | | | |
| | d1 = 0.800 | N1 = 1.69350 | v1 = 53.20 |
| r2* = 3.261 | | | |
| | d2 = 1.306 | | |
| r3 = 5.374 | | | |
| | d3 = 1.643 | N3 = 1.84666 | v2 = 23.78 |
| r4 = 8.587 | | | |
| | d4 = 11.113–4.730–1.500 | | |
| r5 = INF(ST) | | | |
| | d5 = 0.100 | | |
| r6* = 6.440 | | | |
| | d6 = 2.700 | N4 = 1.58313 | v3 = 59.46 |
| r7 = 21.791 | | | |
| | d7 = 0.992 | N5 = 1.80420 | v4 = 46.50 |
| r8 = −17.258 | | | |
| | d8 = 0.800 | N6 = 1.84666 | v5 = 23.78 |
| r9 = 9.052 | | | |
| | d9 = 0.461 | | |
| r10 = 32.852 | | | |
| | d10 = 1.185 | N7 = 1.80420 | v6 = 46.50 |
| r11 = −8.295 | | | |
| | d11 = 3.264–7.269–14.682 | | |
| r12* = 8.698 | | | |
| | d12 = 1.151 | N8 = 1.52510 | v7 = 56.38 |
| r13 = 40.251 | | | |
| | d13 = 2.395–2.146–0.589 | | |
| r14 = INF | | | |
| | d14 = 1.700 | N9 = 1.51680 | v8 = 64.20 |
| r15 = INF | | | |

[Aspherical Coefficient]
```
r2
ε = 0.15350
A4 = 0.10709E − 02
A6 = 0.15594E − 05
A8 = 0.40992E − 05
A10 = −0.14072E − 06
r6
ε = 0.99639
A4 = −0.10102E − 02
A6 = 0.13282E − 03
A8 = −0.61751E − 04
A10 = 0.89979E − 05
r12
ε = 0.18574
A4 = −0.22753E − 03
A6 = 0.22152E − 04
A8 = −0.20494E − 05
A10 = −0.24795E − 06
A12 = 0.31566E − 07
```

<Example 4>
f = 4.3–7.4–12.7
Fno. = 2.80–3.50–4.82

| [Radius of Curvature] | [Axial Distance] | [Refractive Index (nd)] | [Abbe Number (vd)] |
|---|---|---|---|
| r1 = 20.370 | | | |
| | d1 = 0.800 | N1 = 1.80420 | v1 = 46.50 |
| r2* = 3.853 | | | |
| | d2 = 1.381 | | |
| r3 = 6.112 | | | |
| | d3 = 1.676 | N2 = 1.84666 | v2 = 23.78 |
| r4 = 11.173 | | | |
| | d4 = 12.341–5.133–1.500 | | |
| r5 = INF(ST) | | | |
| | d5 = 0.100 | | |
| r6* = 3.144 | | | |
| | d6 = 0.800 | N3 = 1.81474 | v3 = 37.03 |
| r7 = 2.393 | | | |
| | d7 = 1.341 | N4 = 1.58913 | v4 = 61.25 |
| r8 = 5.699 | | | |
| | d8 = 0.800 | N5 = 1.84666 | v5 = 23.78 |
| r9 = 2.911 | | | |
| | d9 = 1.194 | | |
| r10 = 6.125 | | | |
| | d1 = 1.356 | N6 = 1.61800 | v6 = 63.39 |
| r11 = −14.481 | | | |
| | d11 = 3.387–7.171–14.068 | | |
| r12 = 8.013 | | | |
| | d12 = 1.222 | N7 = 1.61800 | v7 = 63.39 |

-continued

| | | | |
|---|---|---|---|
| r13 = 31.092 | | | |
| | d13 = 1.684–1.633–0.617 | | |
| r14 = INF | | | |
| | d14 = 1.700 | N8 = 1.61800 | v8 = 64.20 |
| r15 = INF | | | |

[Aspherical Coefficient]
r2
ε = 0.082016
A4 = 0.89031E − 03
A6 = 0.85045E − 05
A8 = 0.52996E − 06
A10 = −0.28440E − 08
r6
ε = 0.98430
A4 = −0.11022E − 02
A6 = −0.43928E − 04
A8 = −0.14368E − 04
A10 = 0.19844E − 06

<Example 5>
f = 4.8–8.3–14.4
Fno. = 2.40–3.48–4.88

| [Radius of Curvature] | [Axial Distance] | [Refractive Index (nd)] | [Abbe Number (vd)] |
|---|---|---|---|
| r1* = 18.302 | | | |
| | d1 = 0.700 | N1 = 1.77377 | v1 = 47.17 |
| r2* = 5.330 | | | |
| | d2 = 2.312 | | |
| r3 = INF | | | |
| | d3 = 7.300 | N2 = 1.84666 | v2 = 23.78 |
| r4 = INF | | | |
| | d4 = 1.058 | | |
| r5 = −10.423 | | | |
| | d5 = 0.700 | N3 = 1.67003 | v3 = 47.20 |
| r6 = 12.817 | | | |
| | d6 = 2.059 | N4 = 1.83400 | v4 = 37.34 |
| r7 = −14.332 | | | |
| | d7 = 14.836–7.674–0.600 | | |
| r8 = INF(ST) | | | |
| | d8 = 0.100 | | |
| r9* = 6.792 | | | |
| | d9 = 1.764 | N5 = 1.74330 | v5 = 49.33 |
| r10 = −63.330 | | | |
| | d10 = 2.457 | N6 = 1.56883 | v6 = 56.04 |
| r11 = −138.507 | | | |
| | d11 = 0.700 | N7 = 1.75520 | v7 = 27.53 |
| r12 = 5.578 | | | |
| | d12 = 0.831 | | |
| r13 = 17.227 | | | |
| | d13 = 1.267 | N8 = 1.71300 | v8 = 53.94 |
| r14 = −23.244 | | | |
| | d14 = 0.726–11.724–21.069 | | |
| r15 = −11.747 | | | |
| | d15 = 0.700 | N9 = 1.67270 | v9 = 32.17 |
| r16 = −169.983 | | | |
| | d16 = 0.200 | | |
| r17* = 9.384 | | | |
| | d17 = 2.179 | N10 = 1.52200 | v10 = 52.20 |
| r18* = −13.516 | | | |
| | d18 = 6.703–2.867–0.595 | | |
| r19 = INF | | | |
| | d19 = 1.400 | N11 = 1.54426 | v11 = 69.60 |
| r20 = INF | | | |
| | d20 = 0.500 | | |
| r21 = INF | | | |
| | d21 = 0.500 | N12 = 1.51680 | v12 = 64.20 |
| r22 = INF | | | |

[Aspherical Coefficient]
r1
ε = 1.00000
A4 = 0.27232E − 04
A6 = 0.39408E − 05
A8 = −0.14135E − 06
A10 = 0.21831E − 08
r2
ε = 1.00000
A4 = −0.34005E − 03
A6 = −0.54077E − 05
A8 = 0.11468E − 06
A10 = −0.26766E − 07
r9
ε = 1.00000
A4 = −0.18052E − 03
A6 = −0.13514E − 05
A8 = −0.15509E − 06
A10 = 0.35394E − 08
r17
ε = 1.00000
A4 = 0.35361E − 03
A6 = 0.18176E − 04
A8 = 0.13001E − 05
A10 = 0.99636E − 07
r18
ε = 1.00000
A4 = 0.70533E − 03
A6 = 0.39821E − 04
A8 = −0.19361E − 05
A10 = 0.33293E − 06

<Example 6>
f = 4.8–7.8–12.8
Fno. = 2.58–3.57–4.80

| [Radius of Curvature] | [Axial Distance] | [Refractive Index (nd)] | [Abbe Number (vd)] |
|---|---|---|---|
| r1* = 22.792 | | | |
| | d1 = 1.000 | N1 = 1.80432 | v1 = 40.90 |
| r2* = 6.229 | | | |
| | d2 = 2.500 | | |
| r3 = INF | | | |
| | d3 = 7.200 | N2 = 1.84666 | v2 = 23.82 |
| r4 = INF | | | |
| | d4 = 0.831 | | |
| r5 = −24.708 | | | |
| | d5 0.500 | N3 = 1.51680 | v3 = 64.20 |
| r6 = 8.329 | | | |
| | d6 = 2.145 | N4 = 1.62004 | v4 = 36.29 |
| r7 = −32.788 | | | |
| | d7 = 15.275–8.982–2.800 | | |
| r8 = INF | | | |
| | d8 = 0.000 | | |
| r9* = 6.608 | | | |
| | d9 = 2.471 | N5 = 1.68893 | v5 = 31.16 |
| r10 = 5.889 | | | |
| | d10 = 1.489 | N6 = 1.77250 | v6 = 49.62 |
| r11 = −56.295 | | | |
| | d11 = 0.500 | N7 = 1.74077 | v7 = 27.76 |
| r12 = 5.472 | | | |
| | d12 = 0.711 | | |
| r13 = 16.423 | | | |
| | d13 = 1.138 | N8 = 1.74330 | v8 = 49.22 |
| r14 = −28.916 | | | |
| | d14 = 1.170–10.323–18.245 | | |
| r15 = −8.438 | | | |
| | d15 = 0.800 | N9 = 1.67270 | v9 = 32.17 |
| r16 = −27.478 | | | |
| | d16 = 0.100 | | |
| r17* = 14.047 | | | |
| | d17 = 1.910 | N10 = 1.52200 | v10 = 52.20 |
| r18 = −8.669 | | | |
| | d18 = 6.860–4.000–2.259 | | |
| r19 = INF | | | |
| | d19 = 1.400 | N11 = 1.64426 | v11 = 69.60 |
| r20 = INF | | | |
| | d20 = 0.500 | | |
| r21 = INF | | | |
| | d21 = 0.500 | N12 = 1.61680 | v12 = 64.20 |
| r22 = INF | | | |

-continued

[Aspherical Coefficient]
r1
ϵ = 5.4920
r2
ϵ = 1.0396
A4 = −0.15950E − 03
A6 = −0.48677E − 05
A8 = 0.11077E − 06
A10 = −0.71574E − 08
r9
ϵ = 1.0745
A4 = −0.21338E − 03
A6 = −0.27376E − 05
A8 = −0.12249E − 06
r17
ϵ = −12.880
A4 = 0.62509E − 03
A6 = −0.46408E − 04
A8 = 0.39484E − 05
A10 = −0.17953E − 06
r18
ϵ = −0.99348
A4 = −0.13615E − 05
A6 = −0.20891E − 04
A8 = 0.15372E − 05
A10 = 0.49048E − 08
A12 = −0.53253E − 08

<Example 7>
f = 3.7–6.4–11.1
Fno. = 2.80–3.46–4.75

| [Radius of Curvature] | [Axial Distance] | [Refractive Index (nd)] | [Abbe Number (vd)] |
|---|---|---|---|
| r1 = 19.994 | | | |
| | d1 = 0.800 | N1 = 1.80420 | v1 = 46.50 |
| r2* = 3.472 | | | |
| | d2 = 1.546 | | |
| r3 = 5.850 | | | |
| | d3 = 1.626 | N2 = 1.84666 | v2 = 23.78 |
| r4 = 10.302 | | | |
| | d4 = 11.856–5.036–1.500 | | |
| r5 = INF(ST) | | | |
| | d5 = 0.100 | | |
| r6* = 5.145 | | | |
| | d6 = 1.264 | N3 = 1.80420 | v3 = 46.50 |
| r7 = −10.464 | | | |
| | d7 = 1.169 | N4 = 1.48749 | v4 = 70.44 |
| r8 = −7.576 | | | |
| | d8 = 0.800 | N5 = 1.75520 | v5 = 27.53 |
| r9 = 4.564 | | | |
| | d9 = 0.541 | | |
| r10 = 18.200 | | | |
| | d10 = 1.063 | N6 = 1.80420 | v6 = 46.50 |
| r11 = −10.526 | | | |
| | d11 = 4.396–7.331–13.340 | | |
| r12 = 8.998 | | | |
| | d12 = 1.244 | N7 = 1.61800 | v7 = 63.39 |
| r13 = 129.377 | | | |
| | d13 = 0.695–0.958–0.528 | | |
| r14 = INF | | | |
| | d14 = 1.700 | N8 = 1.51680 | v8 = 64.20 |
| r15 = INF | | | |

[Aspherical Coefficient]
r2
ϵ = 0.25203
A4 = 0.70604E − 03
A6 = 0.12790E − 04
A8 = 0.74823E − 06
A10 = −0.26178E − 07
r6
ϵ = 1.1462
A4 = −0.80387E − 03
A6 = 0.63344E − 05

-continued

A8 = −0.11753E − 04
A10 = 0.15469E − 05

<Example 8>
f = 3.7–6.4–11.1
Fno. = 2.80–3.26–4.52

| [Radius of Curvature] | [Axial Distance] | [Refractive Index (nd)] | [Abbe Number (vd)] |
|---|---|---|---|
| r1 = 15.437 | | | |
| | d1 = 0.600 | N1 = 1.77377 | v1 = 47.17 |
| r2* = 4.065 | | | |
| | d2 = 2.427 | | |
| r3 = 6.638 | | | |
| | d3 = 1.700 | N2 = 1.84666 | v2 = 23.78 |
| r4 = 9.175 | | | |
| | d4 = 14.094–4.624–0.758 | | |
| r5 = INF | | | |
| | d5 = 0.641 | | |
| r6* = 5.996 | | | |
| | d6 = 1.600 | N3 = 1.58913 | v3 = 61.25 |
| r7 = −7.178 | | | |
| | d7 = 0.100 | | |
| r8 = 15.198 | | | |
| | d8 = 1.405 | N4 = 1.65160 | v4 = 58.40 |
| r9 = −3.484 | | | |
| | d9 = 0.801 | N5 = 1.80420 | v5 = 46.50 |
| r10 = −3.020 | | | |
| | d10 = 0.600 | N6 = 1.59551 | v6 = 39.22 |
| r11 = 3.194 | | | |
| | d11 = 3.532–4.546–9.953 | | |
| r12* = 9.016 | | | |
| | d12 = 1.500 | N7 = 1.48749 | v7 = 70.44 |
| r13 = −16.883 | | | |
| | d13 = 0.600–1.854–1.737 | | |
| r14 = INF | | | |
| | d14 = 1.700 | N8 = 1.51680 | v8 = 64.20 |
| r15 = INF | | | |

[Aspherical Coefficient]
r2
ϵ = 0.047344
A4 = 0.87594E − 03
A6 = 0.42505E − 04
A8 = −0.19104E − 05
A10 = 0.10896E − 06
r6
ϵ = 1.29260
A4 = −0.26982E − 02
A6 = −0.11629E − 03
A8 = −0.891545E − 05
A10 = 0.94521E − 05
A12 = −0.17799E − 05
r12
ϵ = −4.5109
A4 = 0.22605E − 03
A6 = 0.13383E − 03
A8 = −0.25198E − 04
A10 = 0.24106E − 05
A12 = −0.91614E − 07

<Example 9>
f = 3.7–6.4–11.1
Fno. = 2.80–3.32–4.64

| [Radius of Curvature] | [Axial Distance] | [Refractive Index (nd)] | [Abbe Number (vd)] |
|---|---|---|---|
| r1 = 21.845 | | | |
| | d1 = 1.000 | N1 = 1.77377 | v1 = 47.17 |
| r2* = 4.532 | | | |
| | d2 = 2.285 | | |
| r3 = 7.397 | | | |
| | d3 = 1.602 | N2 = 1.84666 | v2 = 23.78 |

-continued

| [Radius of Curvature] | [Axial Distance] | [Refractive Index (nd)] | [Abbe Number (vd)] |
|---|---|---|---|
| r4 = 11.705 | | | |
| | d4 = 14.749–4.896–0.714 | | |
| r5 = INF(ST) | | | |
| | d5 = 0.100 | | |
| r6* = 8.070 | | | |
| | d6 = 1.716 | N3 = 1.58913 | v3 = 61.25 |
| r7 = −6.828 | | | |
| | d7 = 0.100 | | |
| r8 = 33.916 | | | |
| | d8 = 0.600 | N4 = 1.84666 | v4 = 23.78 |
| r9 = 10.422 | | | |
| | d9 = 1.407 | N5 = 1.80420 | v5 = 46.50 |
| r10 = −3.231 | | | |
| | d10 = 1.717 | N6 = 1.59551 | v6 = 39.22 |
| r11 = 3.154 | | | |
| | d11 = 2.521–3.664–8.419 | | |
| r12* = 7.784 | | | |
| | d12 = 1.200 | N7 = 1.48749 | v7 = 70.44 |
| r13 = −32.962 | | | |
| | d13 = 0.603–1.372–0.600 | | |
| r14 = INF | | | |
| | d14 = 1.700 | N8 = 1.51680 | v8 = 64.20 |
| r15 = INF | | | |

[Aspherical Coefficient]
r2
ε = −0.057547
A4 = 0.73212E − 03
A6 = 0.40379E − 04
A8 = −0.30424E − 05
A10 = 0.15307E − 06
A12 = −0.27398E − 08
r6
ε = −2.3793
A4 = −0.26006E − 02
A6 = −0.13413E − 03
A8 = −0.78171E − 05
A10 = 0.76194E − 05
A12 = −0.18804E − 05
r12
ε = −2.9040
A4 = 0.67481E − 03
A6 = 0.12901E − 03
A8 = −0.19512E − 04
A10 = 0.18944E − 05
A12 = −0.74522E − 07

<Example 10>
f = 3.7–6.4–11.1
Fno. = 2.80–3.33–4.62

| [Radius of Curvature] | [Axial Distance] | [Refractive Index (nd)] | [Abbe Number (vd)] |
|---|---|---|---|
| r1 = 24.410 | | | |
| | d1 = 0.600 | N1 = 1.77377 | v1 = 47.17 |
| r2* = 4.632 | | | |
| | d2 = 2.760 | | |
| r3 = 8.453 | | | |
| | d3 = 1.180 | N2 = 1.84666 | v2 = 23.78 |
| r4 = 3.342 | | | |
| | d4 = 14.689–4.950–0.714 | | |
| r5 = INF(ST) | | | |
| | d5 = 1.000 | | |
| r6* = 7.302 | | | |
| | d6 = 1.500 | N3 = 1.58913 | v3 = 61.25 |
| r7 = −11.987 | | | |
| | d7 = 0.100 | | |
| r8 = 3.463 | | | |
| | d8 = 1.162 | N4 = 1.48749 | v4 = 70.44 |
| r9 = 7.545 | | | |
| | d9 = 0.600 | N5 = 1.62588 | v5 = 35.74 |
| r10 = 6.356 | | | |
| | d10 = 0.600 | N6 = 1.84666 | v6 = 23.78 |

-continued

| | | | |
|---|---|---|---|
| r11 = 2.584 | | | |
| | d11 = 3.271–4.536–9.744 | | |
| r12* = 7.280 | | | |
| | d12 = 1.538 | N7 = 1.48749 | v7 = 70.44 |
| r13 = −27.930 | | | |
| | d13 = 0.600 | | |
| r14 = INF | | | |
| | d14 = 1.700 | N8 = 1.51680 | v8 = 64.20 |
| r15 = INF | | | |

[Aspherical Coefficient]
r2
ε = 0.042158
A4 = 0.45640E − 03
A6 = 0.37721E − 04
A8 = −0.27034E − 05
A10 = 0.12077E − 06
A12 = −0.20555E − 08
r6
ε = 3.9934
A4 = −0.17251E − 02
A6 = −0.52140E − 04
A8 = −0.55250E − 05
A10 = 0.81274E − 06
A12 = −0.65613E − 07
r12
ε = 0.20393
A4 = −0.18824E − 03
A6 = 0.15999E − 04
A8 = 0.10173E − 04
A10 = −0.13747E − 05
A12 = 0.55848E − 07

FIGS. 11 through 20 are aberration diagrams of the first through the tenth examples, each showing aberrations when the zoom lens system according to each example is an infinite focus state. Shown in FIGS. 11 through 20 are aberrations in the minimum focal length state, the intermediate focal length state, the maximum focal length state from the top [Shown from the left hand side are spherical aberrations or the like, astigmatisms and distortion aberrations, and Y' (mm) denotes a maximum image height (which corresponds to a distance from the optical axis) on the imaging sensor.]. In the spherical aberration diagrams, the solid line (d) represents spherical aberrations to the d-line, the dashed line (g) represents spherical aberrations to the g-line, and the broken line (SC) represents the level of dissatisfaction of the sine condition. In the astigmatism diagrams, the broken line (DM) represents astigmatisms at a meriodional surface and the solid line (DS) represents astigmatisms at a sagital surface. In the distortion aberration diagrams, the solid line represents a distortion % to the d-line.

The table below shows values of conditional expressions (1) through (5) and values of a maximum half-angle of view ω in the respective examples.

TABLE

|  | Condition (1) | Condition (2) | Condition (3) | Condition (4) | Condition (5) | ω |
|---|---|---|---|---|---|---|
| Example 1 | 0.6663 | 6.8218 | 0.0568 | −0.2174 | 23.78 | 34.15 |
| Example 2 | 0.1280 | 1.6306 | 0.0447 | 1.1474 | 35.45 | 34.12 |
| Example 3 | −0.1686 | 1.7405 | 0.0368 | 0.2263 | 23.78 | 33.92 |
| Example 4 | 0.0385 | 0.7311 | 0.0556 | 0.1486 | 23.78 | 30.08 |
| Example 5 | 0.0981 | 1.4149 | 0.0330 | 0.2847 | 27.52 | 32.89 |
| Example 6 | 0.0941 | 1.3768 | 0.0000 | 0.2811 | 27.75 | 32.00 |
| Example 7 | 0.0598 | 1.3905 | 0.0503 | 0.3811 | 27.52 | 34.08 |
| Example 8 | 0.6526 | 4.1067 | 0.2227 | −0.6249 | 39.23 | 33.61 |
| Example 9 | 0.8298 | 9.1665 | 0.0336 | −0.5455 | 39.23 | 34.02 |
| Example 10 | 0.1454 | 0.9360 | 0.3743 | −0.5301 | 23.78 | 33.98 |

As described above, the zoom lens system according to each preferred embodiment allows to obtain an imaging lens device comprising a zoom lens system which has a low eccentric sensitivity but is compact and has an excellent optical capability.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An imaging lens device comprising:

a zoom lens system which comprises a plurality of lens units and changes gaps between the lens units to thereby generate an optical image of an object which can be optically and successively zoomed in and out; and an imaging sensor which converts an optical image generated by the zoom lens system into an electric signal, wherein the zoom lens system comprises, from the object side:

a first unit having a negative power, a second unit having a positive power, the second unit having a cemented lens element joining three lens elements, and a lens element having a positive power, a third unit having a positive power, and an aperture stop disposed between the first unit and the second unit, wherein among the three lens elements which form the cemented lens element, a lens element disposed on the object side directs a convex surface toward the object side while a lens element disposed on the image side directs a concave surface toward the image side, and wherein the following condition expressions are satisfied:

$-0.2 < (R21-R24)/(R21+R24) < 1.0$ $0.6 < R21/Fw < 10.0$ $0.0 \leq h2/ha4 < 1.0$ where R21: a paraxial radius of curvature of the object side-lens surface of the cemented lens element, R24: a paraxial radius of curvature of the image surface side-lens surface of the cemented lens element, Fw: a focal length of the overall system at the wide-angle end, ha4: a distance from an optical axis of an intersection of a principal ray which is at 0.8× of a maximum half-angle of view ω at the wide-angle end and the image surface side-lens surface of the cemented lens element, h2: a distance from an optical axis of an intersection of the principal ray which is at 0.8× of a maximum half-angle of view ω at the wide-angle end and the outermost lens surface of the second unit toward the object side, and where the principal ray is a ray which propagates on the center of the aperture stop.

2. An imaging lens device as claimed in claim 1, wherein the following condition is fulfilled:

$-0.7 < fb/fa < 1.2$ where fa: a focal length of the cemented lens element, and fb: a focal length of the lens element which has a positive power.

3. An imaging lens device as claimed in claim 1, wherein a most object side surface of the second unit is an aspheric surface.

4. An imaging lens device as claimed in claim 1, wherein a most image side surface of the second unit is an aspheric surface.

5. An imaging lens device as claimed in claim 1, wherein the first unit has a doublet structure comprising a negative meniscus lens which has an aspheric surface and is convex toward the object side and a positive meniscus lens which is convex toward the object side.

6. An imaging lens device as claimed in claim 1, wherein the first unit has a structure of two negative lens elements and one positive lens element.

7. An imaging lens device as claimed in claim 1, wherein the aperture stop is disposed at the object side of the second unit and moved as one unit together with the second unit.

8. An imaging lens device as claimed in claim 1, wherein the lens element of the second unit is a single lens whose both surfaces are convex surfaces.

9. An imaging lens device as claimed in claim 1, wherein the first unit comprises the prism which has a reflection surface so as to bend an optical axis of an object ray by about 90 degrees.

10. An digital camera comprising:

an imaging lens device having a zoom lens system and an imaging sensor;

the zoom lens system which comprises a plurality of lens units and changes gaps between the lens units to thereby generate an optical image of an object which can be optically and successively zoomed in and out; and the imaging sensor which converts an optical image generated by the zoom lens system into an electric signal, wherein the zoom lens system comprises, from the object side:

a first unit having a negative power, a second unit having a positive power, the second unit having a cemented lens element joining three lens elements, and a lens element having a positive power, a third unit having a positive power, and an aperture stop disposed between the first unit and the second unit, wherein among the three lens elements which form the cemented lens element, a lens element disposed on the object side directs a convex surface toward the object side while a lens element disposed on the image side directs a concave surface toward the image side, and wherein the following condition expressions are satisfied:

$$-0.2 < (R21-R24)/(R21+R24) < 1.0$$

$$0.6 < R21/Fw < 10.0$$

$$0.0 \leq h2/ha4 < 1.0$$

where

R21: a paraxial radius of curvature of the object side-lens surface of the cemented lens element, R24: a paraxial radius of curvature of the image surface side-lens surface of the cemented lens element, Fw: a focal length of the overall system at the wide-angle end, ha4: a distance from an optical axis of an intersection of a principal ray which is at 0.8× of a maximum half-angle of view ω at the wide-angle end and the image surface side-lens surface of the cemented lens element, h2: a distance from an optical axis of an intersection of the principal ray which is at 0.8× of a maximum half-angle of view ω at the wide-angle end and the outermost lens surface of the second unit toward the object side, and where the principal ray is a ray which propagates on the center of the aperture stop.

11. A cellular telephone comprising:

an imaging lens device having a zoom lens system and an imaging sensor;

the zoom lens system which comprises a plurality of lens units and changes gaps between the lens units to thereby generate an optical image of an object which can be optically and successively zoomed in and out; and the imaging sensor which converts an optical image generated by the zoom lens system into an electric signal, wherein the zoom lens system comprises, from the object side:

a first unit having a negative power, a second unit having a positive power, the second unit having a cemented lens element joining three lens elements, and a lens element having a positive power, a third unit having a positive power, and an aperture stop disposed between the first unit and the second unit, wherein among the three lens elements which form the cemented lens element, a lens element disposed on the object side directs a convex surface toward the object side while a lens element disposed on the image side directs a concave surface toward the image side, and wherein the following condition expressions are satisfied:

$$-0.2 < (R21-R24)/(R21+R24) < 1.0$$

$$0.6 < R21/Fw \leq 10.0$$

$$0.0 \leq h2/ha4 \leq 1.0$$

where

R21: a paraxial radius of curvature of the object side-lens surface of the cemented lens element, R24: a paraxial radius of curvature of the image surface side-lens surface of the cemented lens element, Fw: a focal length of the overall system at the wide-angle end, ha4: a distance from an optical axis of an intersection of a principal ray which is at 0.8× of a maximum half-angle of view ω at the wide-angle end and the image surface side-lens surface of the cemented lens element, h2: a distance from an optical axis of an intersection of the principal ray which is at 0.8× of a maximum half-angle of view ω at the wide-angle end and the outermost lens surface of the second unit toward the object side, and where the principal ray is a ray which propagates on the center of the aperture stop.

* * * * *